United States Patent
Sibeud

(10) Patent No.: US 11,966,251 B2
(45) Date of Patent: Apr. 23, 2024

(54) DEVICE FOR GENERATING A SUPPLY/BIAS VOLTAGE AND A CLOCK SIGNAL FOR A SYNCHRONOUS DIGITAL CIRCUIT

(71) Applicant: COMMISSARIAT A L'ENERGIE ATOMIQUE ET AUX ENERGIES ALTERNATIVES, Paris (FR)

(72) Inventor: Loic Sibeud, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 1 day.

(21) Appl. No.: 17/765,749

(22) PCT Filed: Sep. 28, 2020

(86) PCT No.: PCT/FR2020/051684
§ 371 (c)(1),
(2) Date: Mar. 31, 2022

(87) PCT Pub. No.: WO2021/064313
PCT Pub. Date: Apr. 8, 2021

(65) Prior Publication Data
US 2022/0365551 A1    Nov. 17, 2022

(30) Foreign Application Priority Data

Oct. 2, 2019   (FR) ...................... 19 10898

(51) Int. Cl.
*G06F 1/08*   (2006.01)
*G06F 1/3203*   (2019.01)
(Continued)

(52) U.S. Cl.
CPC ............... *G06F 1/08* (2013.01); *G06F 1/324* (2013.01); *G06F 1/3296* (2013.01); *G06F 1/3203* (2013.01)

(58) Field of Classification Search
CPC ...... G06F 1/3203; G06F 1/324; G06F 1/3296; G06F 1/08
See application file for complete search history.

(56) References Cited

U.S. PATENT DOCUMENTS 5,585,754 A   12/1996  Yamashina et al.
5,727,193 A    3/1998  Takeuchi
(Continued)

OTHER PUBLICATIONS

Marcos Mauricio Pelicia et al., "A Back Biasing Voltage Generator for 28nm UTBB-FDSOI RVT CMOS Digital Circuits", 2018 International Conference on IC Design & Technology (ICICDT), IEEE, Jun. 4, 2018 (Jun. 4, 2018). pp. 1-4, DOI: 10.I 109/ICICDT.2018. 8399721, XP033367998.

(Continued)

*Primary Examiner* — Ji H Bae
(74) *Attorney, Agent, or Firm* — Oblon, McClelland, Maier & Neustadt, L.L.P.

(57) ABSTRACT

A device for generating a supply or bias voltage and a clock signal for a synchronous digital circuit is provided. The device includes an oscillator circuit comprising a propagation path representative of a critical path of the circuit and which varies with a supply or bias voltage to the oscillator, and outputting a periodic signal, the frequency whereof depends on the propagation path delay; a resistive element; a switched capacitor coupled to the output of the oscillator such that the switching frequency thereof corresponds to the frequency of the periodic signal or to a multiple or divisor of this frequency; and an amplifier circuit outputting, from an output coupled to a power supply input or bias input of the oscillator, a voltage, the amplitude whereof is representative of a difference between the resistance R and the equivalent resistance of the switched capacitor.

20 Claims, 9 Drawing Sheets

(51) Int. Cl.
*G06F 1/324* (2019.01)
*G06F 1/3296* (2019.01)

(56) References Cited

U.S. PATENT DOCUMENTS

| | | | |
|---|---|---|---|
| 6,342,817 B1* | 1/2002 | Crofts | H03K 4/023 |
| | | | 331/1 R |
| 2002/0190283 A1 | 12/2002 | Seno et al. | |
| 2014/0320216 A1* | 10/2014 | Wang | H03L 7/00 |
| | | | 331/25 |
| 2015/0254384 A1 | 9/2015 | Dumchin et al. | |
| 2019/0196564 A1* | 6/2019 | Murtagh | G06F 1/12 |
| 2019/0235566 A1* | 8/2019 | Ensafdaran | H03K 5/1252 |

OTHER PUBLICATIONS

International Search Report dated Jan. 29, 2021 in PCT/FR2020/051684 filed Sep. 28, 2020, 2 pages.
French Preliminary Search Report (with English translation of Categories of Cited Documents) dated May 30, 2020 in French Application 1910898 filed on Oct. 2, 2019, 2 pages.

* cited by examiner

DEVICE FOR GENERATING A SUPPLY/BIAS VOLTAGE AND A CLOCK SIGNAL FOR A SYNCHRONOUS DIGITAL CIRCUIT

TECHNICAL FIELD AND PRIOR ART

The invention relates to the field of synchronous digital electronic circuits, and proposes a solution for reducing the power consumption of such circuits.

The maximum operating frequency of a synchronous digital circuit corresponds to the maximum clock frequency at which the circuit operates correctly. Above this maximum clock frequency, the circuit no longer operates correctly and produces errors.

The value of this maximum clock frequency depends on the critical path delay of the circuit. The critical path of a synchronous digital circuit is the path between two successive flip-flops (with no flip-flops interposed therebetween) in the circuit for which the propagation delay of a signal in this path is the longest of all the paths between two existing successive flip-flops in the circuit. Thus, the minimum period of the clock signal clocking the circuit, the value whereof corresponds to the inverse of the maximum clock frequency, must not be less than the critical path delay of the circuit so as not to generate errors.

In this case, and in the remaining paragraphs, the setup time $t_{setup}$ of the flip-flop located at the end of the critical path is considered to be included in the critical path delay.

When selecting the clock frequency used to clock the circuit, several factors must be taken into account, which factors affect the speed of operation of the circuit:
- variations regarding the process for manufacturing components in the circuit (process variations),
- the operating temperature of the circuit, and
- the supply voltage $V_{DD}$ of the circuit.

The value of the supply voltage $V_{DD}$ of such a circuit is chosen such that the circuit can operate correctly at the required speed, even in the most unfavourable configuration, i.e. considering the largest process variations and the most unfavourable operating temperature.

Moreover, the value of the supply voltage $V_{DD}$ is generally chosen to match that characterising the standard cells used in the design of the circuit, and is chosen to be greater than the supply voltage value required to satisfy the operating speed constraint of the circuit.

The margin between the value of the supply voltage $V_{DD}$ applied to the circuit and the value required solely by the speed constraint of the circuit corresponds to an unnecessary excessive consumption of power by the circuit, especially in cases of favourable process and operating temperature variations where the circuit thus becomes much faster than necessary. Proportionally, this excessive power consumption is even greater for circuits powered in weak inversion (circuits operating at very low power with a supply voltage value close to or lower than the threshold voltage of the transistors of the circuit) where the difference in the speed of operation of the circuit due to the process variations and the operating temperature of the circuit is much greater than for circuits supplied with strong inversion (fast circuits requiring a higher supply voltage).

One solution for reducing this excessive consumption is to automatically adjust the supply voltage $V_{DD}$ of the circuit as a function of the operating temperature, process variations and speed at which the circuit must operate.

This solution is based on the use of a circuit of the CPR (Critical Path Replica) type, which includes a signal propagation path that replicates the critical path of the circuit, i.e. the propagation delay of a signal between the input and the output of this path corresponds to the critical path delay of the circuit, to measure the maximum speed that the circuit can achieve. The supply voltage of the CPR, which is identical to that of the circuit, is adjusted by feedback until the sum of the delay in the propagation path of the CPR and of a margin delay $\Delta$ is equal to the period of the clock signal applied to the flip-flops of the circuit. The margin delay $\Delta$ is added in order to be able to avoid errors between the propagation path delay of the CPR and the critical path delay of the circuit, due for example to manufacturing dispersions or voltage variations in the supply gate of the circuit.

Such a solution can be implemented by means of a DLL (Delay-Locked Loop), as described for example in the U.S. Pat. No. 8,046,601 B1. In this configuration, the clock signal is applied at the input of the CPR and its phase is compared with that of the delayed clock signal obtained at the output of the CPR. A control system adjusts the supply voltage of the CPR until the clock signal and the clock signal delayed by the CPR applied at the inputs of the phase comparator are in phase, thus indicating that the propagation delay through the CPR is equal to the period of the clock signal.

This solution can also be implemented by means of a PLL (Phase-Locked Loop), as described for example in the U.S. Pat. No. 5,585,754. In this configuration, the CPR is made inverting and then looped back on itself to obtain an oscillator, the output whereof is compared to the clock signal by a phase comparator which also controls a charge pump, the supply voltage being obtained from the output signal output by the charge pump. The supply voltage is adjusted until the oscillation period of the CPR connected as an oscillator is equal to the period of the clock signal.

Another approach to reducing the excessive power consumption of the circuit is to adjust the threshold voltage of the transistors by back-biasing. The principle of this approach is similar to that used to adjust the value of the supply voltage of the circuit: the intrinsic speed of the circuit, measured using a CPR, is compared with the required speed determined by the period of the clock signal, and then the threshold voltages of the P and N transistors are adjusted by feedback until the speed of the circuit conforms to the period of the clock signal plus the margin delay. Such an approach is possible when the transistors are of the FDSOI (Fully-Depleted Silicon-On-Insulator) type and include a back gate that allows the back face of these transistors to be biased, and only reduces the power consumption due to leakage and simultaneously conducting currents of the N and P transistors. It does not allow the dynamic consumption due to the capacitors formed by the interconnects to be reduced.

The main drawback of the aforementioned techniques is that they all require a separate clock signal source and CPR, as well as all the circuitry associated with the feedback (phase detector, charge pump). The complexity and power consumption of these solutions make them unattractive for very low power applications.

DESCRIPTION OF THE INVENTION

One purpose of the present invention is to propose a device for generating at least one supply or bias voltage and at least one clock signal, for supplying or biasing, and clocking, a synchronous digital circuit, by optimising the value of the supply or bias voltage as far as possible in order to limit the excessive consumption of power by the synchronous digital circuit.

For this purpose, the invention proposes a device for generating at least one supply or bias voltage and at least one clock signal, configured to supply a synchronous digital circuit or to bias the back faces of FDSOI transistors of the synchronous digital circuit and to clock the synchronous digital circuit, comprising at least:
- an oscillator circuit comprising a signal propagation path, the delay whereof is representative of the delay of a critical path of the synchronous digital circuit and which varies as a function of the value of a power supply voltage to the oscillator circuit or of at least one back-bias voltage to FDSOI transistors of the oscillator circuit, and configured to output, from an output, a periodic signal, the frequency whereof depends on the delay of the signal propagation path;
- a resistive element of resistance R;
- a switched capacitor comprising a capacitance C and which is coupled to the output of the oscillator circuit such that the switching frequency of the switched capacitor corresponds to the frequency of the periodic signal output from the output of the oscillator circuit or to a multiple or to a divisor of the frequency of the periodic signal output from the output of the oscillator circuit;
- an amplifier circuit configured to output, from an output coupled to a power supply input of the oscillator circuit or to at least one back-bias voltage input of the FDSOI transistors of the oscillator circuit, a voltage, the amplitude whereof is representative of a difference between the value of the resistance R and the value of an equivalent resistance of the switched capacitor.

Furthermore, the invention more particularly proposes a device for generating at least one supply voltage and at least one clock signal, configured to supply and clock a synchronous digital circuit, comprising at least:
- an oscillator circuit comprising a signal propagation path, the delay whereof is representative of the delay of a critical path of the synchronous digital circuit and which varies as a function of the value of a power supply voltage to the oscillator circuit, and configured to output, from an output which is capable of being coupled to a clock input of the synchronous digital circuit, a periodic signal, the frequency whereof depends on the delay of the signal propagation path;
- a resistive element of resistance R;
- a switched capacitor comprising a capacitance C and which is coupled to the output of the oscillator circuit such that the switching frequency of the switched capacitor corresponds to the frequency of the periodic signal output from the output of the oscillator circuit or to a multiple or to a divisor of the frequency of the periodic signal output from the output of the oscillator circuit;
- an amplifier circuit configured to output, from an output coupled to a power supply input of the oscillator circuit, a voltage, the amplitude whereof is representative of a difference between the value of the resistance R and the value of an equivalent resistance of the switched capacitor.

The invention further proposes a device for generating at least one bias voltage and at least one clock signal, configured to bias the back faces of FDSOI transistors of the synchronous digital circuit and to clock the synchronous digital circuit, comprising at least:
- an oscillator circuit comprising a signal propagation path, the delay whereof is representative of the delay of a critical path of the synchronous digital circuit and which varies as a function of the value of at least one back-bias voltage to FDSOI transistors of the oscillator circuit, and configured to output, from an output which is capable of being coupled to a clock input of the synchronous digital circuit, a periodic signal, the frequency whereof depends on the delay of the signal propagation path;
- a resistive element of resistance R;
- a switched capacitor comprising a capacitance C and which is coupled to the output of the oscillator circuit such that the switching frequency of the switched capacitor corresponds to the frequency of the periodic signal output from the output of the oscillator circuit or to a multiple or to a divisor of the frequency of the periodic signal output from the output of the oscillator circuit;
- an amplifier circuit configured to output, from an output coupled to at least one back-bias voltage input of the FDSOI transistors of the oscillator circuit, a voltage, the amplitude whereof is representative of a difference between the value of the resistance R and the value of an equivalent resistance of the switched capacitor.

The supply voltage for supplying the synchronous digital circuit, or the one or more bias voltages for biasing the back faces of FDSOI transistors of the synchronous digital circuit, may correspond to the voltage obtained at the output of the amplifier circuit, or may correspond to one or more other voltages obtained by converting the voltage obtained at the output of the amplifier circuit.

The clock signal for clocking, or synchronising, the synchronous digital circuit may correspond to the periodic signal output from the output of the oscillator circuit, or may correspond to a signal obtained by multiplying or dividing the frequency of the periodic signal output from the output of the oscillator circuit.

A multiple of a frequency corresponds to the product of that frequency multiplied by a positive integer. A divisor of a frequency corresponds to the result of that frequency divided by a positive integer.

In this device, the supply voltage to the synchronous digital circuit or of the one or more back-bias voltages to the FDSOI transistors of the synchronous digital circuit is obtained from the supply voltage to the oscillator circuit or from the one or more back-bias voltages to the FDSOI transistors of the oscillator circuit whose loop delay, or propagation path delay, is representative of the critical path delay of the synchronous digital circuit. In this device, the period of the periodic signal output from the output of the oscillator circuit, and thus also the delay of the signal propagation path of the oscillator circuit, is slaved to the RC constant, or more generally to the constant $\alpha \cdot RC$ where a is a positive non-zero number, by controlling its supply voltage or its one or more back-bias voltages to its FDSOI transistors.

The delay of the signal propagation path of the oscillator circuit varies as a function of the value of the power supply voltage to the oscillator circuit, of the one or more back-bias voltages to its FDOI transistors when the oscillator circuit includes such FDSOI transistors capable of being back-biased, but also as a function of the process for manufacturing the components of the oscillator circuit and the operating temperature of the oscillator circuit, in the same way as the synchronous digital circuit. This device thus proposes reducing the power consumption of the synchronous digital circuit by generating an optimal supply voltage or at least a back-bias voltage to the FDSOI transistors, the one or more values whereof take into account the manufacturing process, the temperature, and the speed at which the synchronous digital circuit must operate.

Thus, when the synchronous digital circuit does not include FDSOI transistors capable of being back-biased, the device proposed here limits the power consumption of the synchronous digital circuit by controlling the supply voltage to the synchronous digital circuit. When the synchronous digital circuit includes FDSOI transistors that are capable of being back-biased, the device proposed here limits the power consumption of the synchronous digital circuit either by controlling the supply voltage to the synchronous digital circuit, or by controlling one or more back-bias voltages to the FDSOI transistors of the synchronous digital circuit (for example a first bias voltage intended to be applied to the back face of the P-type FDSOI transistors and a second bias voltage intended to be applied to the back face of the N-type FDSOI transistors).

The device described has the advantage of not using a PLL- or DLL-type loop, and thus forms a simpler, less expensive and more energy-efficient solution for generating the supply voltage or the one or more bias voltages, and the clock signal of the synchronous digital circuit.

The invention is advantageously applicable to very low power applications, such as in the field of the Internet of Things (IoT) or implanted medical electronics.

In this document, the term "coupled" means that two elements coupled to one another are connected to one another either directly (with no intermediate element therebetween) or indirectly (with one or more intermediate elements therebetween). Moreover, the term "coupled" is used throughout the document to refer to an electrical coupling between two elements.

The oscillator circuit may be of the CPR type or may include at least one ring oscillator.

The oscillator circuit may be configured such that the frequency of the periodic signal output from the output of the oscillator circuit is $f_{OSC}=1/(td_{MAX}+\Delta)$, where $td_{MAX}$ corresponds to the critical path delay of the synchronous digital circuit and $\Delta$ corresponds to a margin delay. Thus, this margin delay ensures that the frequency of the periodic signal output from the output of the oscillator circuit is not higher than the maximum operating frequency of the synchronous digital circuit.

The signal propagation path of the oscillator circuit may have an odd number of inverting elements and may form a loop such that an output of the signal propagation path is connected to an input of the signal propagation path, and the propagation delay between the input and the output of the signal propagation path may be equal to $1/(2 \cdot f_{OSC})$. Thus, the period of the periodic signal output from the output of the oscillator circuit corresponds to the time required to travel the propagation path twice, i.e. $1/f_{OSC}$.

In a first configuration, the amplifier circuit may include:
 a first current source coupled to the resistive element and a second current source coupled to the switched capacitor, the first and second current sources being configured to output electrical currents of the same value into the resistive element and the switched capacitor;
 a differential amplifier connected as an integrator, including a first input coupled to the resistive element such that a voltage across the terminals of the resistive element is applied to the first input, and a second input coupled to the switched capacitor such that a voltage across the terminals of the switched capacitor is applied to the second input.

In a second configuration, the amplifier circuit may include:
 a current source coupled to the resistive element and to the switched capacitor, which are coupled in series to one another;
 two impedances coupled in series to one another and in parallel to the resistive element and the switched capacitor;
 a differential amplifier connected as an integrator, including a first input coupled to a first node to which the two impedances are coupled, and a second input coupled to a second node to which the resistive element and the switched capacitor are coupled.

The device may further include a logic circuit comprising an input coupled to the output of the oscillator circuit and at least two outputs each coupled to one of at least two switches of the switched capacitor, the logic circuit being capable of being configured to output, from the two outputs, periodic signals of frequency equal to $f_{OSC}/N$, where N is an integer greater than or equal to 1, and each alternately controlling the opening and closing of one of the two switches of the switched capacitor.

A power supply input of the logic circuit may be coupled to the power supply input of the oscillator circuit. In particular, when the oscillator circuit is supplied with a supply voltage obtained, directly or via a conversion element, from the output of the amplifier circuit, the logic circuit may thus also be powered with this same supply voltage.

The switched capacitor may include at least two capacitors coupled in series to one another and each having a capacitance of value C/2, each of the two capacitors being coupled in parallel to a switch of the switched capacitor. This configuration allows the voltage variations across the terminals of the switched capacitor that generate noise at these terminals to be halved.

The oscillator circuit may be configured to output, from its output, a periodic signal comprising K phases, where K is an integer greater than or equal to 2, and the device may include K switched capacitors coupled in parallel to one another and coupled to the output of the oscillator circuit such that each of the K switched capacitors is controlled by one of the K phases of the periodic signal. This configuration allows the voltage variations across the terminals of the switched capacitors that generate noise at these terminals to be reduced by a factor of K.

The device may further include a voltage converter of the DC-to-DC type comprising an input coupled to the output of the amplifier circuit. In this configuration, the supply and/or bias voltage to the synchronous digital circuit corresponds to the voltage obtained at the output of the converter. The voltage converter may have a gain of 1 or of more than 1.

The voltage converter may be configured to output a voltage equal to the sum of the voltage applied to its input and a voltage margin $\Delta V$. Similarly to when the oscillator circuit applies a margin delay $\Delta$, such a voltage margin allows the device to avoid errors between the propagation path delay of the CPR and the critical path delay of the circuit. This voltage margin may be obtained by including an offset in the voltage converter, i.e. by making the voltage converter add the voltage margin $\Delta V$ to the voltage applied to its input, or by giving it a gain greater than 1, i.e. such that the voltage converter multiplies the voltage applied to its input by a factor of greater than 1.

The device may further include, when the device is configured to bias the rear faces of FDSOI transistors of the synchronous digital circuit, at least one charge pump circuit comprising an input coupled to the output of the amplifier circuit and comprising at least one output coupled to said at least one back-bias voltage input of the FDSOI transistors of the oscillator circuit. The charge pump circuit allows a multiplication factor to be applied to the voltage output by the amplifier circuit to obtain a voltage value suitable for back-biasing the FDSOI transistors of the oscillator circuit and the synchronous digital circuit. The multiplication factor is, for example, equal to 3.

When P- and N-type FDSOI RVTs (Regular Voltage Transistors) are intended to be back-biased, the device may include a first charge pump circuit comprising an input coupled to the output of the amplifier circuit, an output coupled to the back-bias voltage input of the P-type transistors and a positive multiplication factor, and a second charge pump circuit comprising an input coupled to the output of the amplifier circuit, an output coupled to the back-bias voltage input of the N-type transistors and a negative multiplication factor. Furthermore, when the device includes the differential amplifier, the first input of the differential amplifier coupled to the resistive element may correspond to the non-inverting input of the differential amplifier, and the second input of the differential amplifier coupled to the switched capacitor may correspond to the inverting input of the differential amplifier.

When P- and N-type FDSOI LVTs (Low Voltage Transistors) are intended to be back-biased, the device may include a first charge pump circuit comprising an input coupled to the output of the amplifier circuit, an output coupled to the back-bias voltage input of the N-type transistors and a positive multiplication factor, and a second charge pump circuit comprising an input coupled to the output of the amplifier circuit, an output coupled to the back-bias voltage input of the P-type transistors and a negative multiplication factor. Furthermore, when the device includes the differential amplifier, the first input of the differential amplifier coupled to the resistive element may correspond to the inverting input of the differential amplifier, and the second input of the differential amplifier coupled to the switched capacitor may correspond to the non-inverting input of the differential amplifier.

The device may further include at least one of the following elements:
- a first element equivalent to a multiplier of the value of the resistance R;
- a second element equivalent to a multiplier of the value of the impedance of the switched capacitor;
- a frequency divider interposed between the output of the oscillator circuit and the switched capacitor;
- a frequency multiplier coupled to the output of the oscillator circuit.

The invention further relates to an electronic chip comprising at least:
- a device as described hereinabove;
- a synchronous digital circuit comprising a power supply input and/or at least one back-bias input of FDSOI transistors coupled to the output of the amplifier circuit or, when the device includes a voltage converter coupled to the output of the amplifier circuit, to the output of the voltage converter or, when the device includes at least one charge pump circuit coupled to the output of the amplifier circuit, to the output of said at least one charge pump circuit.

The power supply input of the synchronous digital circuit may be coupled to the power supply input of the oscillator circuit, or said at least one back-bias voltage input of FDSOI transistors of the synchronous digital circuit may be coupled to said at least one back-bias voltage input of the FDSOI transistors of the oscillator circuit.

BRIEF DESCRIPTION OF THE FIGURES

The present invention will be better understood after reading the following description of example embodiments, given for purposes of illustration only and not intended to limit the scope of the invention, with reference to the accompanying drawings, in which.

Identical, similar or equivalent parts of the different figures described hereinbelow bear the same reference numerals in order to ease passage from one figure to another.

The different parts shown in the figures are not necessarily displayed according to a uniform scale in order to make the figures easier to read.

The different possibilities (alternatives and embodiments) must be understood as not being exclusive with regard to one another and can be combined with one another.

DETAILED DESCRIPTION OF SPECIFIC EMBODIMENTS

Figure 1:
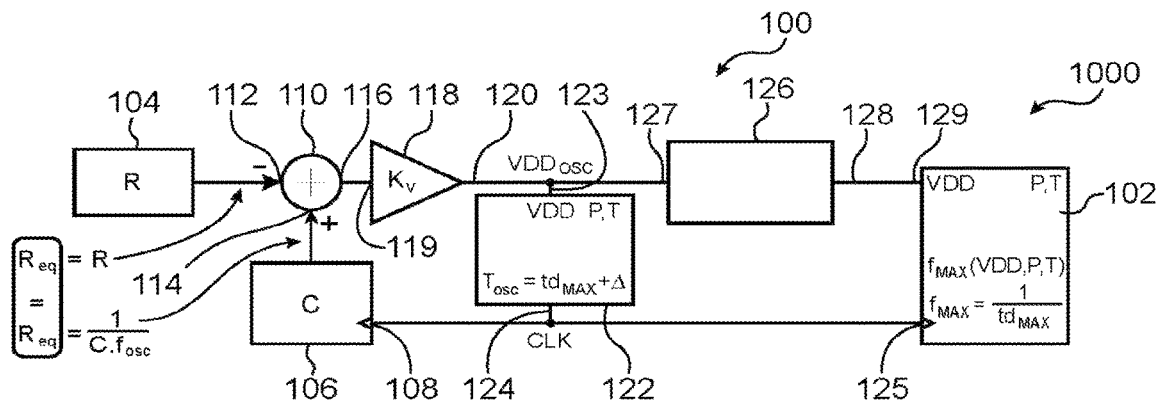
FIG. 1 diagrammatically shows a device for generating a supply voltage and a clock signal intended to supply and clock a synchronous digital circuit, which is the subject matter of the present invention, according to a first embodiment.

FIG. 1 described hereinbelow diagrammatically shows a device 100 for generating a supply voltage and a clock signal configured to supply and clock a synchronous digital circuit 102, according to a first embodiment.

The device 100 includes a resistive element 104, for example an electrical resistor, of impedance R.

The device 100 further includes a switched capacitor 106. The switched capacitor 106 includes an input 108 to which is applied a periodic signal CLK of frequency $f_{OSC}$, corresponding in this case to a square-wave signal, controlling the switching of the switched capacitor 106. The switching frequency of the switched capacitor 106 is equal to $f_{OSC}$ The equivalent resistance $R_{eq}$ of the switched capacitor 106 is such that:

$$R_{eq}=1/(C \cdot f_{OSC})$$

where C is the value of the electrical capacitance of the switched capacitor 106.

The device 100 further includes an element 110 including a first input 112 coupled to the resistive element 104 and a second input 114 coupled to the output of the switched capacitor 106. The element 110 includes an output 116 from which a signal is output, corresponding to a voltage or a current, representative of the difference in values between R and $R_{eq}$. This signal has, for example, an amplitude whose value is representative of this difference in impedance.

The device 100 further includes an amplifier 118, an input 119 whereof is coupled to the output 116 of the element 110, and outputting, from an output 120, a voltage $V_{DDosc}$, the amplitude whereof depends on that of the signal applied to the input 119 thereof.

The element 110 and the amplifier 118 together form an amplifier circuit having the function of amplifying the difference in impedance values between R and $R_{eq}$, and outputting, from the output 120, a voltage, the amplitude whereof is representative of a difference between the value of the resistance R of the resistive element 104 and the value of the equivalent resistance $R_{eq}$ of the switched capacitor 106.

The device 100 further includes an oscillator circuit 122 comprising a power supply input 123 coupled to the output 120 of the amplifier 118, and outputting, at an output 124, the periodic signal CLK of frequency $f_{OSC}$. The oscillator circuit 122 includes components, for example combinatorial logic components, forming a signal propagation path, the delay whereof is representative of the critical path delay of the circuit 102. These components are selected and configured such that the period $T_{OSC}$ of the periodic signal CLK output from the output 124 is such that, under the same operating conditions (same supply voltage, same process variations, same operating temperature) $T_{OSC}=td_{MAX}+\Delta$, where $td_{MAX}$ corresponds to the critical path delay of the circuit 102 and $\Delta$ corresponds to the margin delay used to ensure that $T_{OSC}>td_{MAX}$ even in the presence of errors or variations between the propagation path delay of the oscillator circuit 122 and $td_{MAX}$. The output 124 of the oscillator circuit 122 is coupled to the input 108 of the switched capacitor 106 and to a clock input 125, or synchronisation input, of the circuit 102.

The device 100 advantageously includes a converter 126 of the DC-to-DC type, or DC-to-DC converter, an input 127 whereof is coupled to the output 120 of the amplifier 118, and includes an output 128 from which a voltage $V_{DD}$ converted by the converter 126 is output. The converter 126 has, for example, a gain substantially equal to 1, with the voltage $V_{DD}$ output from the output 128 thereof having a similar amplitude to that of the voltage $V_{DDosc}$ received at the input 127 thereof. The output 128 of the converter 126 is coupled to a power supply input 129 of the circuit 102.

The converter 126 acts as an isolation and impedance matching element between the power supply input of the circuit 102 and the output 120 of the amplifier 118. The converter 126 allows the oscillator circuit 122 to be isolated from disturbances to the voltage $V_{DD}$ caused by the dynamic power consumption of the circuit 102, and thus allows a stable signal CLK to be maintained. The converter 126 is also used to provide a current of sufficient amplitude for the circuit 102 to operate correctly. The converter is, for example, a linear or switching regulator, such as an LDO-type regulator (low-dropout) or a buck-type converter or regulator.

The device 100 thus forms a feedback loop in which the critical path delay $td_{MAX}$ of the circuit 102 is estimated using a combinatorial logic block of the oscillator circuit 122 in which the propagation delay is representative of the critical path delay $td_{MAX}$ of the circuit 102. The oscillator circuit 122 further forms an oscillator generating the clock signal clocking the circuit 102.

Advantageously, the delay of the propagation path formed in the oscillator circuit 122 is equal to the sum of half the critical path delay of the circuit 102 $td_{MAX}/2$ and half the margin delay $\Delta/2$. Once looped back into an oscillator, the oscillator circuit 122 thus has an oscillation period $T_{OSC}=td_{MAX}+\Delta$, the value whereof is thus slightly greater than that of the critical path delay $td_{MAX}$ of the circuit 102.

By using, in the oscillator circuit 122, logic elements made from standard cells that are identical or similar to those used to make the logic elements of the circuit 102, the propagation delay in the oscillator circuit 122 evolves in a manner similar to $td_{MAX}$ as a function of the process, supply voltage and operating temperature variations (PVT variations). Thus, under the same PVT conditions as the circuit 102, the oscillation period of the oscillator circuit 122 is always greater than or equal to the critical path delay of the circuit 102.

In the device 100, the frequency $f_{OSC}$ (which is equal to $1/T_{OSC}$) of the periodic signal CLK output from the output 124 of the oscillator circuit 122 is controlled by a feedback loop, formed by the resistive element 104, the switched capacitor 106, the element 110, the amplifier 118 and the oscillator circuit 122, controlling the value of the voltage $V_{DDosc}$, corresponding to the supply voltage to the oscillator circuit 122, such that the oscillation period $T_{OSC}$ of the periodic signal CLK output from the output 124 of the oscillator circuit 122 tends towards the value of the RC constant.

The values of R and C are chosen so that the value of the inverse of the RC constant corresponds to the value of the desired operating frequency of the circuit 102. However, the values of R and C could be chosen so that the value of the inverse of the RC constant corresponds to a multiple or a divisor of the value of the desired operating frequency of the circuit 102. The desired operating frequency of the circuit 102 may correspond to a multiple of the inverse of the RC constant (a multiple less than, greater than or equal to 1).

The alignment of the values of $T_{OSC}$ and RC is obtained by comparing the value of the resistance R of the resistive element 102 with the value of the equivalent resistance Req of the switched capacitor 106 switching at the frequency $f_{OSC}$. The feedback loop of the device 100 assesses the difference between R and Req and adjusts the value of the voltage $V_{DDosc}$ to bring the value of this difference closer to 0. When the values of R and Req are sufficiently close to one another, the value of $T_{OSC}$ corresponding approximately to the value of the RC constant is obtained.

In this first embodiment, the signal CLK generated by the oscillator circuit 122 is used directly as a clock signal applied to the clock input 125 of the circuit 102, which means that the period of the clock signal supplied to the circuit 102 is approximately equal to the RC constant.

The device 100 thus makes it possible to generate, for a synchronous digital circuit, both a clock signal corresponding to the periodic signal CLK of frequency $f_{CLK}=f_{OSC}=1/(RC)$ and a supply voltage $V_{DD}$ which makes it possible to obtain a critical path delay equal to RC−Δ. The simultaneous slaving of the period of the clock signal CLK and of the critical path delay to the same RC constant, calibrated at the time of its creation and stable in temperature, guarantees the correct operation of the circuit 102 while avoiding unnecessary excessive power consumption.

The oscillator circuit 122 corresponds, for example, to a ring oscillator, comprising an odd number of inverters, or to a CPR configured as an oscillator. Producing the oscillator circuit 122 as a ring oscillator has the advantage of reducing the power consumption and/or jitter of the oscillator circuit 122 compared to a CPR configured as an oscillator. However, producing the oscillator circuit 122 as a CPR configured as an oscillator has the advantage of achieving a more accurate slaving of $td_{MAX}$ with respect to the RC constant, and thus of requiring a smaller margin delay Δ.

Advantageously, the margin delay Δ is programmable or adjustable, making the device 100 more robust and flexible.

The resistive element 104 and the switched capacitor 106 may be fully or partially integrated with the other elements of the device 100. By its nature, the RC constant is insensitive to the process variations related to the production of transistors, and may be chosen such that it undergoes almost no drift as a result of the operating temperature of the device 100. Thus, after calibration of the RC constant to compensate for the process dispersions related to the production of the resistive element 104 and the switched capacitor 106, the circuit 102 supplied by the voltage $V_{DD}$ has a critical path delay equal to RC−Δ. The critical path delay of the circuit 102 thus becomes independent of the process dispersions and operating temperature since these dispersions are taken into account in determining the value of the supply voltage $V_{DD}$.

The assembly shown in FIG. 1 including the device 100 and the digital circuit 102 forms part of an electronic chip 1000 further including other electronic elements not visible in FIG. 1.

Figure 2:
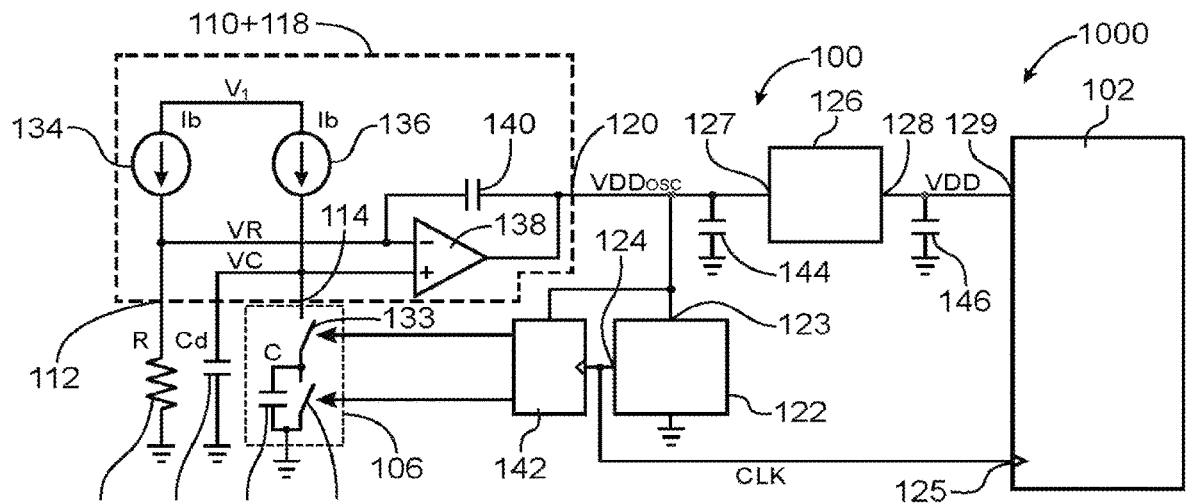
FIG. 2 diagrammatically shows a first configuration of the device for generating a supply voltage and a clock signal intended to supply and clock a synchronous digital circuit, which is the subject matter of the present invention, according to the first embodiment.

FIG. 2 described hereinbelow shows a first configuration of the device 100 according to the first embodiment described hereinabove with reference to FIG. 1.

In this first configuration, the resistive element 104 includes an electrical resistance of impedance R.

The switched capacitor 106 includes a capacitor 130 of electrical capacitance C. The switched capacitor 106 further includes two switches 132, 133 corresponding, for example, to transistors, coupled to the capacitor 130 such that alternate closure of these switches 132, 133 causes an alternation of charging and discharging phases of the capacitor 130 at the frequency at which the switches 132, 133 are closed and opened.

The device 100 according to this first configuration further includes a first current source 134 supplied by a voltage $V_1$ and outputting a current Ib through the resistive element 104, and a second current source 136 outputting the same current Ib into the switched capacitor 106. The current sources 134, 136 include, for example, MOS transistors.

The device 100 further includes a differential amplifier 138 connected as an integrator, with the output thereof looped back to the inverting input thereof via a capacitor 140. The inverting input of the differential amplifier 138 is coupled to a terminal of the resistive element 104 such that a voltage $V_R=R \cdot Ib$ is applied to the inverting input of the differential amplifier 138. The non-inverting input of the differential amplifier 138 is coupled to a terminal of the switched capacitor 106 such that a voltage $V_C=Ib/(C \cdot f_{OSC})$ is applied to the non-inverting input of the differential amplifier 138.

The current sources 134, 136, the differential amplifier 138 and the capacitor 140 together form the element 110 and the amplifier 118 of the arrangement previously described with reference to FIG. 1, i.e. an amplifier circuit having the function of amplifying the difference in impedance values between R and $R_{eq}$, and outputting, from the output 120, a voltage, the amplitude whereof is representative of a difference between the value of the resistance R of the resistive element 104 and the value of the equivalent resistance $R_{eq}$ of the switched capacitor 106. The output of the differential amplifier 138 corresponds to the output 120 of the amplifier 118.

The output of the differential amplifier 138 is coupled to the power supply input 123 of the oscillator circuit 122 and to the input 127 of the converter 126.

The device 100 further includes a logic circuit 142 receiving, as input, the periodic signal CLK output from the output 124 of the oscillator circuit 122 and outputting two non-overlapping periodic signals, i.e. signals which always have opposite values to one another, which control the switching of the switches 132, 133 of the switched capacitor 106. Thus, at no time are the switches 132, 133 both in the closed position. The signals output by the logic circuit 142 are periodic, have a frequency equal to $f_{OSC}$, and correspond, for example, to square-wave signals. The logic circuit 142 further includes a power supply input coupled to the output of the differential amplifier 138.

The device 100 further includes a capacitor 143 of value Cd coupled in parallel with the switched capacitor 106, the function of which is to smooth the charging current received by the capacitor 130 and to reduce the variations in the voltage $V_C$ that lead to noise on this electrical line (variations known as "ripple" in English).

The device 100 further includes two filter capacitors 144, 146 coupled to the input 127 and to the output 128 of the converter 126 respectively.

In this first configuration of the device 100, the slaving of the equivalent resistance $R_{eq}$ of the switched capacitor 106 to the resistance R of the resistive element 104 is implemented in the voltage domain by applying a current to the resistive element 104 and the switched capacitor 106. A voltage $V_R$ is formed across the terminals of the resistive element 104 and a voltage $V_C$ is formed across the terminals of the switched capacitor 106, for example using two identical currents Ib, then an error amplifier corresponding to the differential amplifier 138 integrates the difference between the voltages $V_R$ and $V_C$. The signal output from the differential amplifier 138 is then used as the supply voltage to the oscillator circuit 122 and the associated logic circuit 142.

Figure 3:
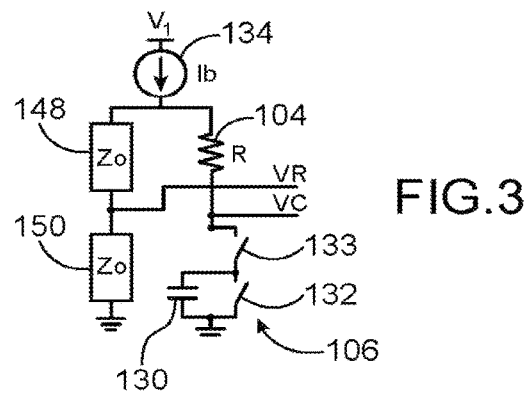
FIG. 3 diagrammatically shows a part of a second configuration of the device for generating a supply or bias voltage and a clock signal intended to supply or bias and clock a synchronous digital circuit, which is the subject matter of the present invention, according to the first embodiment.

According to a second configuration of the device 100, the resistive element 104 and the switched capacitor 106 may be coupled in series, as shown in FIG. 3, in which only a part of the device 100 is visible. This configuration ensures that the resistive element 104 and the switched capacitor 106 have the same current Ib flowing therethrough.

In this second configuration, the device 100 further includes two impedances 148, 150 coupled in series and of identical value $Z_0$, forming a second branch coupled in parallel to the first branch formed by the resistive element 104 and the switched capacitor 106 and allowing for the application, at the input of the differential amplifier 138, of the voltage $V_R$ such that it is equal to half the voltage present at the terminals of the assembly formed by the resistive element 104 and the switched capacitor 106. These two impedances 148, 150 correspond, for example, to resistors, or to switched capacitors, or to diode-connected transistors.

In this second configuration, the differential amplifier 138 integrates the difference between the voltage $V_C$ obtained at a node to which the resistive element 104 and the switched capacitor 106 are coupled, and the voltage $V_R$ obtained at another node to which the two impedances 148, 150 are coupled. Similarly to the first configuration, the signal output from the differential amplifier 138 is used as the supply voltage for the oscillator circuit 122 and the logic circuit 142. The loop thus formed within the device 100 establishes the following equality:

$$(V_R+V_C)/2=V_C, \text{ i.e. } V_R=V_C$$

Alternatively, the values of the impedances 148, 150 may be adjustable.

Moreover, the value of the impedance 148 may be different from that of the impedance 150. Such an alternative embodiment allows the frequency $f_{OSC}$ of the generated signal CLK to be modified. For example, with an impedance value 148 greater than that of the impedance 150, the frequency $f_{OSC}$ of the signal CLK is greater than that which would be obtained when the impedance values 148, 150 are identical. Thus, if the value of the impedance 148 is equal to $3 \cdot Z_0$ and if that of the impedance 150 is equal to $Z_0$, the frequency $f_{OSC}$ obtained in such a case will be three times higher than that obtained when the two impedances 148, 150 have the value $Z_0$.

According to another alternative embodiment, the value of the resistive element 104 may be variable. This further alternative embodiment is compatible with having impedance values 148, 150 that are adjustable and/or different from one another, and allows a potentially arbitrary multiplication factor to be defined.

In the configurations described hereinabove, the switched capacitor 106 includes a capacitor 130 coupled to two switches 132, 133 that switch at the frequency $f_{OSC}$. According to an alternative embodiment applicable to these two configurations, the switched capacitor 106 may include two capacitors 130, 131 connected in series with one another, each of value C/2, the coupling node between these two capacitors 130, 131 being connected to a coupling node between the two switches 132, 133. In such a switched capacitor 106 shown in FIG. 4, regardless of the configuration of the switches 132, 133, one of the two capacitors 130, 131 is always in a charging phase. Compared to the switched capacitor 106 described hereinabove with reference to FIGS. 2 and 3, this alternative embodiment allows half as many charges to be extracted from the capacitor 143 during a charging phase of one of the capacitors 130, 131, but twice as often over the total duration of a period $T_{OSC}$. This alternative embodiment allows, compared to a switched capacitor 106 comprising a single capacitor 130 as described hereinabove with reference to FIGS. 2 and 3, the ripple-type variations to be halved.

Figure 5:
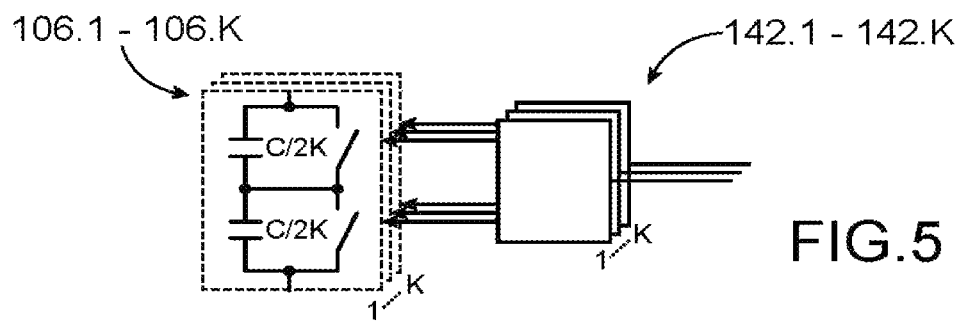
FIG. 5 shows an alternative embodiment of switched capacitors and of logic circuits of a device for generating a supply or bias voltage and a clock signal, which is the subject matter of the present invention.

According to another alternative embodiment, when the oscillator circuit 122 outputs a periodic signal CLK comprising a plurality of phases, for example K phases (where K is an integer greater than or equal to 2), the value of the capacitance C may be divided by K, and the device 100 may include K switched capacitors 106.1-106.K coupled in parallel with one another so that each of these switched capacitors 106.1-106.K is controlled by a clock signal that does not overlap with the other clock signals (which means that at any time, only one of the clock signals is in the high state) controlling the switching of the other switched capacitors 106.1-106.K, these K clock signals being generated by K logic circuits 142.1-142.K, each from one of the K phases of the signal output from the oscillator circuit 122. This alternative embodiment may apply to switched capacitors 106 each including a single capacitor 130 as described hereinabove with reference to FIGS. 2 and 3, where, in such a case, ripple-type variations are reduced by a factor K. This alternative embodiment may further apply to switched capacitors 106 each including two capacitors 130, 131 as shown in FIG. 5. In the configuration shown in FIG. 5, the ripple-type variations are divided by a factor of 2K.

Figure 6:
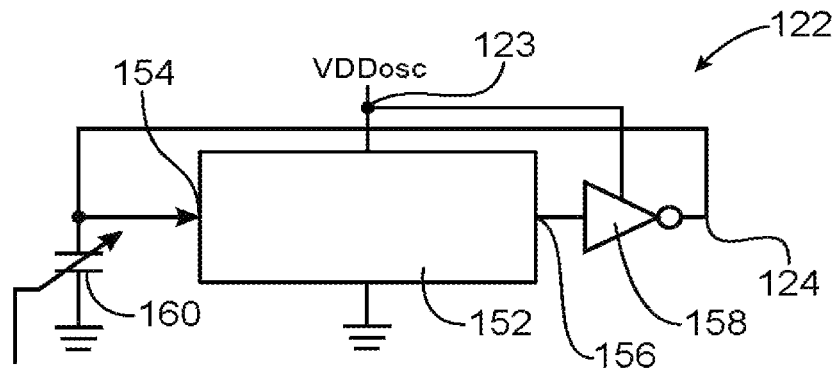
FIGS. 6 to 8 show example embodiments of an oscillator circuit of a device for generating a supply or bias voltage and a clock signal, which is the subject matter of the present invention.

A first example embodiment of the oscillator circuit 122 is shown in FIG. 6. In this first example embodiment, the oscillator circuit 122 is of the CPR type and includes combinatorial logic components 152 such as AND, OR gates, etc., forming, between an input 154 and an output 156, a propagation path such that the propagation delay of a signal between the input 154 and the output 156 is representative of the critical path delay of the circuit 102. Advantageously, the propagation path delay formed by the components 152 is equal to the sum of half the critical path delay of the circuit 102 $td_{MAX}/2$ and half the margin delay $\Delta/2$.

In this first example embodiment, the oscillator circuit 122 further includes an inverter 158 comprising its input coupled to the output 156 of the propagation path formed by the components 152. The output of the inverter 158 is looped back to the input 154 of the path formed by the components 152.

Since it is looped back as an oscillator in this manner, the oscillator circuit 122 has an oscillation period $T_{OSC}=td_{MAX}+$ Δ. The oscillator circuit 122 further includes a variable capacitor 160 connected to the input 154 for adjusting the value of the margin delay Δ.

Figure 7:
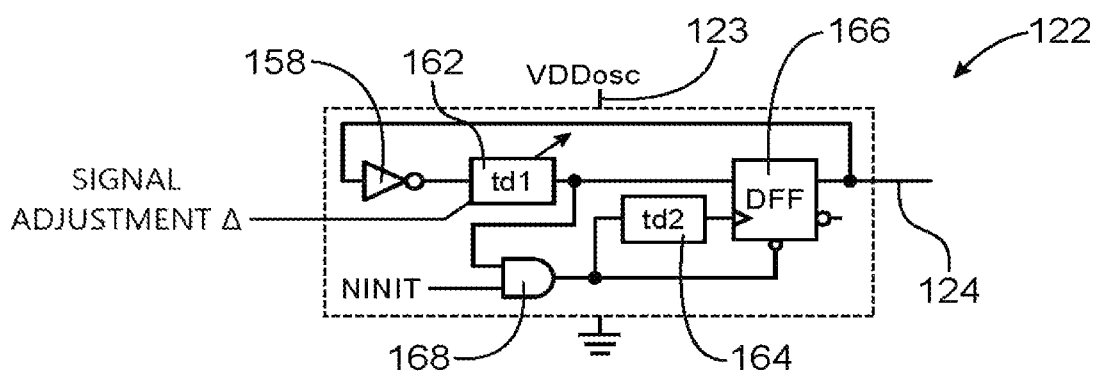

FIG. 7 shows a second example embodiment of the oscillator circuit 122. In this second example embodiment, the oscillator circuit 122 includes two combinatorial logic elements 162, 164, each forming a propagation path, the delay whereof is representative of the critical path delay of the circuit 102, and advantageously equal to the sum of half the critical path delay of the circuit 102 $td_{MAX}/2$ and half the margin delay Δ/2. The oscillator circuit 122 further includes a flip-flop 166, in this case a D flip-flop, with a data input D coupled to the output of the element 162, with a clock input H coupled to the output of the element 164, and with a reset input coupled to the output of an AND gate 168. The output Q of the flip-flop 166, which forms the output 124 of the oscillator circuit 122, is looped back to the input of the element 162 via the inverter 158. The output of the AND gate 168 is also coupled to the input of the element 164. A first input of the AND gate 168 is coupled to the output of the element 162, and an initialisation signal NINIT, controlling the start of the oscillation of the oscillator circuit 122 when the value thereof is in a high state, is sent to a second input of the AND gate 168. The margin delay Δ is adjusted by a signal adjusting the propagation delay through the element 162. In such an oscillator, the sum of the propagation delays through the elements 162 and 164 is greater than the setup time $t_{setup}$ of the D flip-flop 166.

Figure 8:
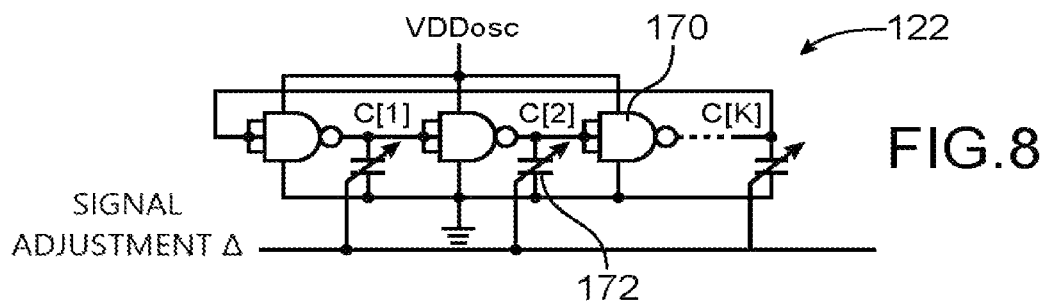

FIG. 8 shows a third example embodiment of the oscillator circuit 122. In this third example embodiment, the oscillator circuit 122 corresponds to a ring oscillator comprising an odd number of logic gates 170 of the NAND type (as is the case in FIG. 8) or of the NOR type with at least 2 inputs, or of inverters, connected in series with one another (with the output of the last logic gate looped back to the input of the first logic gate). The output of each of these gates 170 is further coupled to a load capacitance 172. The values of the load capacitances 172 may be adjusted by programming, allowing the sensitivity of the delay of the oscillator circuit 122 to be adjusted to that of the critical path of the circuit, as well as the margin delay Δ to be adjusted. The load capacitances 172 may correspond to metal routing capacitances and/or transistor gate capacitances (NMOS and/or PMOS).

When the oscillator circuit 122 corresponds to a ring oscillator, the margin delay Δ may be adjusted via an adjustment of the values of the load capacitances and/or via an adjustment of the number of stages of the oscillator. This margin delay Δ may be fixed or programmable.

Figure 9:
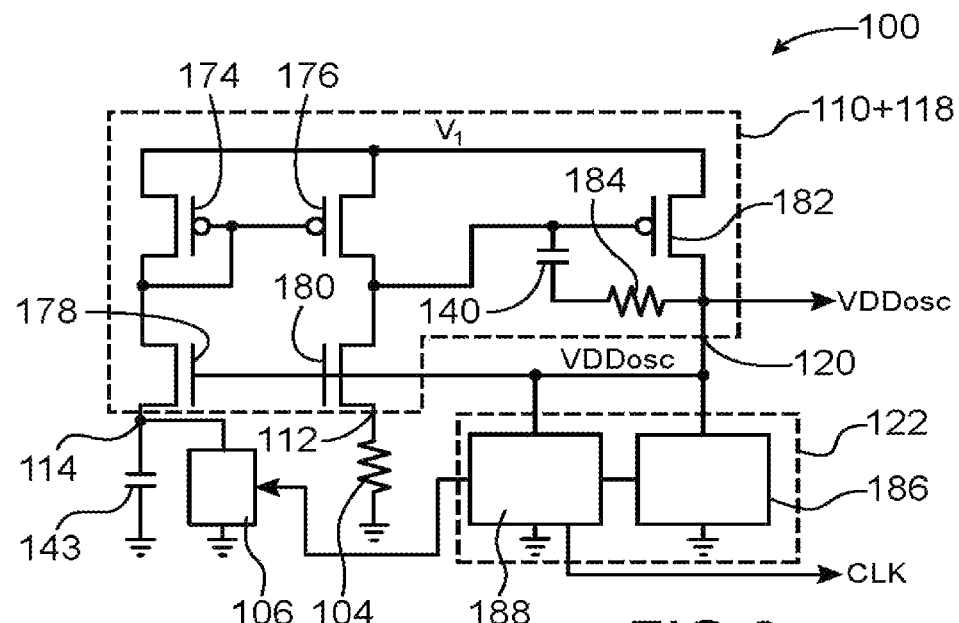
FIGS. 9 and 10 show example embodiments of the device for generating a supply voltage and a clock signal, which is the subject matter of the present invention, according to the first embodiment.

FIG. 9 shows an example embodiment of the device 100 according to the first embodiment. A first example embodiment of the amplifier circuit formed by the element 110 and the amplifier 118 is in particular described with reference to this FIG. 9.

In this example, the current sources 134, 136 and the differential amplifier 138 are formed by five MOS transistors 174, 176, 178, 180 and 182.

A first PMOS transistor 174 has its source coupled to the supply voltage V1. The gate of the first PMOS transistor 174 is coupled to its drain.

A second PMOS transistor 176 has its source coupled to the supply voltage V1. The gate of the second transistor 176 is coupled to the gate of the first PMOS transistor 174.

A third NMOS transistor 178 has its drain coupled to the drain of the first PMOS transistor 174, its source coupled to the switched capacitor 106 and to the capacitor 143, and its gate coupled to the output 120 of the amplifier circuit 110+118.

A fourth NMOS transistor 180 has its drain coupled to the drain of the second PMOS transistor 176, its source coupled to the resistive element 104, and its gate coupled to the output 120 of the amplifier circuit 110+118.

A fifth PMOS transistor 182 has its source coupled to the supply voltage V1, its gate coupled to the drain of the second PMOS transistor 176, and its drain coupled to the output 120 of the amplifier circuit 110+118. The drain of the fifth PMOS transistor 182 is looped back to its gate via the capacitor 140 and a resistor 184.

These transistors 174, 176, 178, 180, 182 are coupled such that they form a circuit that is self-biased using the generated voltage $V_{DDOSC}$, which in particular ensures equality between the currents flowing through the resistive element 104 and the switched capacitor 106 and which amplifies the difference between the voltage $V_R$ across the terminals of the resistive element 104 and the voltage $V_C$ across the terminals of the switched capacitor 106. The MOS transistor 182 in particular performs an amplification function and outputs the voltage $V_{DDosc}$ at the drain thereof.

Finally, the oscillator circuit 122 in this case is implemented as two separate elements coupled to one another: a ring oscillator 186 and a logic circuit 188 outputting the periodic signal CLK from the output signal output by the ring oscillator 186.

In FIG. 9, the converter 126 is not shown.

A further example embodiment of the device 100 is described with reference to FIG. 10.

Compared to the previous example described with reference to FIG. 9, the device 100 shown in FIG. 10 further includes two MOS transistors 190, 192 forming a current source independent of the other transistors and providing the current Ib intended to flow through the resistive element 104 and the switched capacitor 106. In this case, the transistor 192 has an identical or higher threshold voltage than the transistor 190.

Figure 10:
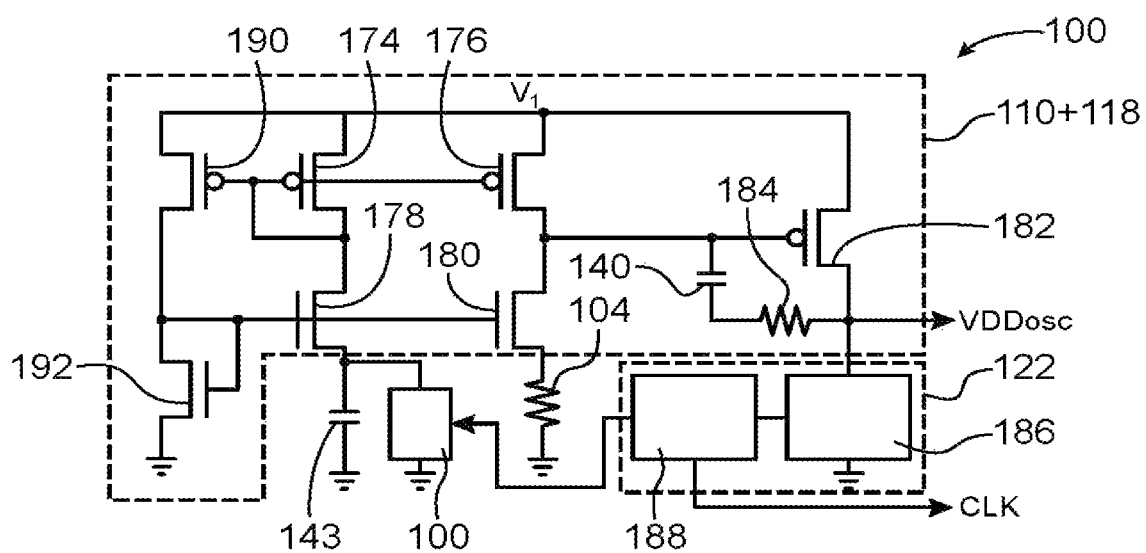

In FIG. 10, the source of the PMOS transistor 190 is coupled to the supply voltage V1, its gate is coupled to that of first PMOS transistor 174, and its drain is coupled to the gate of third NMOS transistor 178. The drain of the NMOS transistor 192 is coupled to the drain of the PMOS transistor 190, its gate is connected to its drain, and its source is coupled to an electric reference potential, for example ground.

Figure 11:
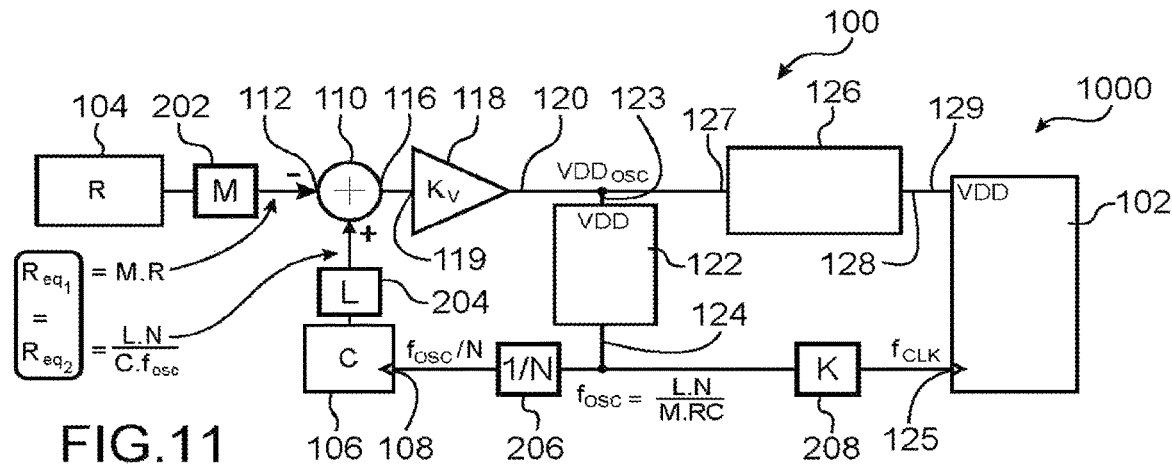
FIG. 11 diagrammatically shows a device for generating a supply voltage and a clock signal intended to supply and clock a synchronous digital circuit, which is the subject matter of the present invention, according to a second embodiment.

FIG. 11 diagrammatically shows the device 100 according to a second embodiment.

The device 100 according to this second embodiment includes all the elements of the device 100 according to the first embodiment described hereinabove with reference to FIG. 1.

Moreover, the device 100 includes a first element 202 whose function is equivalent to that of a multiplier, multiplying the impedance value of the resistive element 104 by a factor M, where M is a positive integer. In the presence of this first element 202, the element 110 has its first input 112 coupled to an impedance $R_{eg1}=M \cdot R$.

The device 100 further includes a second element 204 whose function is equivalent to that of a multiplier, multiplying the impedance value of the switched capacitor 106 by a factor L, where L is a positive integer. Moreover, the device 100 further includes a frequency divider element 206 dividing by a factor of 1/N, interposed between the output 124 of the oscillator circuit 122 and the input 108 of the switched capacitor 106, the switching frequency of the switched capacitor 106 being equal to $f_{OSC}/N$, where $f_{OSC}$ is the frequency of the periodic signal output from the oscillator circuit 122 and where N is a positive integer. The element 110 thus has its second input 114 coupled to an impedance $R_{eq2}=(L \cdot N)/(C \cdot f_{OSC})$.

The device 100 according to the second embodiment further includes a frequency multiplying element 208 multiplying by a factor K, interposed between the output 124 of the oscillator circuit 122 and the clock input 125 of the circuit 102, where K is a positive integer. The circuit 102 is thus clocked by a clock signal of frequency $f_{CLK}=K \cdot f_{OSC}$.

In the device 100 according to the second embodiment, the circuit 102 is clocked by a clock signal, the period $T_{CLK}$ whereof is an integral fraction of RC. Thus, from the device 100 according to this second embodiment, a plurality of clock frequencies may be generated via a parameterisation of the values of one or more of the parameters M, L, N and K, allowing for example the device 100 to have different operating modes for the digital circuit 102 (standby or sleep mode, slow mode, fast mode, etc.)

If the parameters M, L, N and K are each chosen to be equal to 1, the device 100 operates in a similar manner to the device 100 according to the first embodiment described hereinabove.

The frequency $f_{CLK}$ of the clock signal provided to the circuit 102 is adjusted by the parameters M, N, L, and K, all of which are digitally controlled, and can thus be different from the frequency $f_{OSC}$ of the signal output from the oscillator circuit 122, or from the frequency $f_{OSC}/N$ at which the switched capacitor 106 is switched. For each value of $f_{OSC}$, controlled by M, N, L, and K, the voltage $V_{DD}$ adapts so that the critical path delay $td_{MAX}$ remains below $T_{OSC}$.

Figure 12:
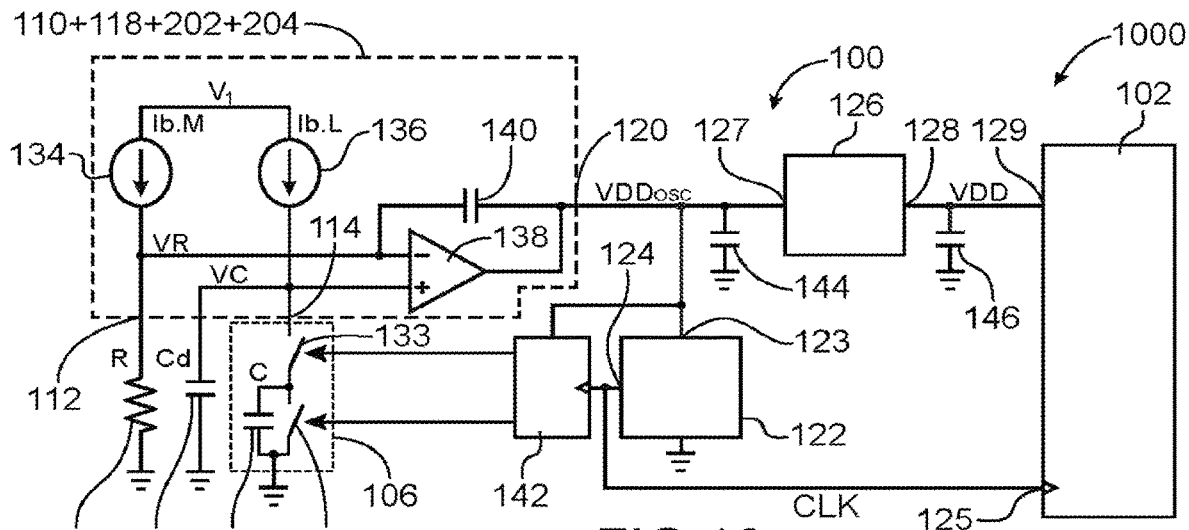
FIG. 12 diagrammatically shows a configuration of the device for generating a supply voltage and a clock signal intended to supply and clock a synchronous digital circuit, which is the subject matter of the present invention, according to the second embodiment.

FIG. 12 shows a configuration of the device 100 according to the second embodiment described hereinabove.

In this example embodiment, the elements 104, 106, 122, 126, 138, 140 and 143 are similar to those described hereinabove with reference to FIG. 2. The impedance multiplying functions corresponding to the multiplier elements 202 and 204 are implemented by making the first current source 134 such that it outputs a current into the resistive element 104 of a value equal to M·Ib, and by making the second current source 136 such that it outputs a current into the switched capacitor 106 of a value equal to L·Ib.

The frequency dividing and multiplying functions corresponding to the frequency dividing element 206 and the frequency multiplying element 208 are implemented by the logic circuit 142. In this example embodiment, the clock signal CLK is provided to the clock input 125 of the circuit 102 by the logic circuit 142.

Figure 4:
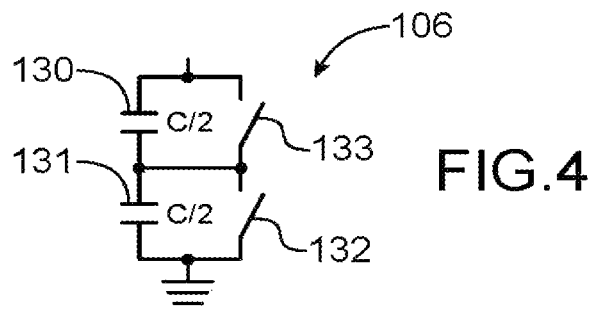
FIG. 4 shows an alternative embodiment of a switched capacitor of a device for generating a supply or bias voltage and a clock signal, which is the subject matter of the present invention.

The alternative embodiment described hereinabove with reference to FIG. 4, wherein the switched capacitor 106 comprises two capacitors 130, 131 coupled in series to one another, may be applied to the device 100 according to the second embodiment.

The alternative embodiment described hereinabove with reference to FIG. 5, wherein the oscillator circuit 122 outputs a periodic signal CLK comprising a plurality of phases, may be applied to the device 100 according to the second embodiment.

Figure 13:
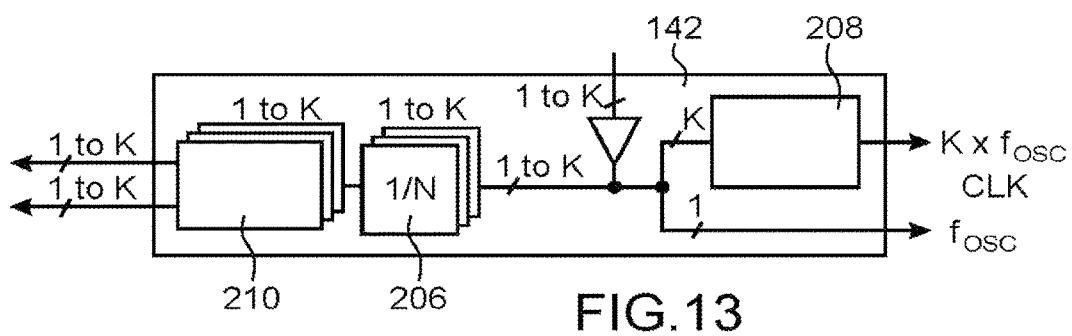
FIG. 13 shows an example embodiment of a logic circuit of a device for generating a supply or bias voltage and a clock signal, which is the subject matter of the present invention.

If the oscillator circuit 122 consists of K identical stages, $f_{OSC}$ may be multiplied such that $f_{CLK}=K \cdot f_{OSC}$ using an XOR function with K inputs connected to the K phases of the signal output by the oscillator circuit 122. FIG. 13 shows an example embodiment of the logic circuit 142 comprising an XOR-type gate with K inputs forming the element 208. In such a case, the delay of the path formed by each stage of the oscillator circuit 122 represents at least half the critical path delay. The logic circuit 142 further includes K frequency dividing elements 206 and K logic elements 210 to prevent overlap between the control signals sent to the switched capacitors.

Figure 14:
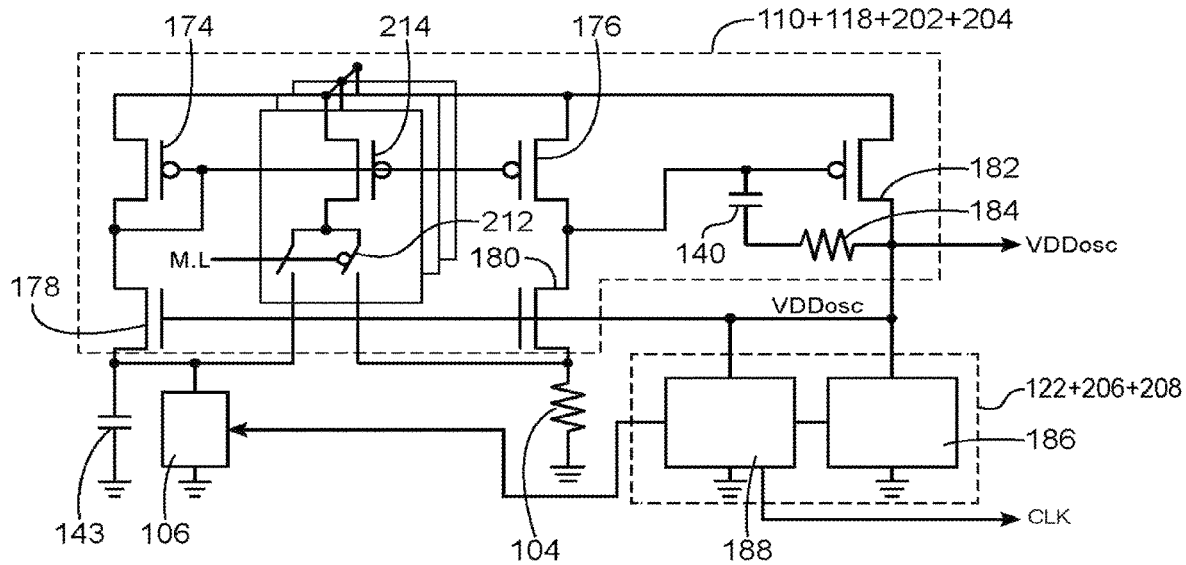
FIGS. 14 to 16 show example embodiments of the device for generating a supply voltage and a clock signal, which is the subject matter of the present invention, according to the second embodiment.

FIG. 14 shows an example embodiment of the device 100 according to the second embodiment. An example embodiment of the element 110, the amplifier 118, the oscillator circuit 122 and the elements 202, 204, 206 and 208 is in particular described with reference to this FIG. 14 (the converter 126 is not shown in this figure).

As in the example described hereinabove with reference to FIG. 9, the current sources 134, 136 and the differential amplifier 138 are formed by five MOS transistors 174, 176, 178, 180 and 182. These transistors are coupled such that they form a circuit that is self-biased using the generated voltage $V_{DDosc}$, and which in particular amplifies the difference between the voltage $V_R$ across the terminals of the resistive element 104 and the voltage $V_C$ across the terminals of the switched capacitor 106. The MOS transistor 182 in particular performs the amplification function and outputs the voltage $V_{DDosc}$ at the drain thereof.

Compared to the arrangement described hereinabove with reference to FIG. 9, the values of the parameters M and L are adjusted by switches 212 which allow for the modification of the relationship between the current M·Ib flowing through the resistive element 104 and the current L·Ib flowing through the switched capacitor 106 via the connection of additional transistors 214 which provide an additional current supply to the resistive element 104 and/or the switched capacitor 106. The parameters M and L are, for example, such that the sum of the values of these two parameters M and L is constant, regardless of the parameterisation carried out.

In this example embodiment, the frequency dividing and multiplying elements 206, 208 are implemented within the logic circuit 188.

Figure 15:
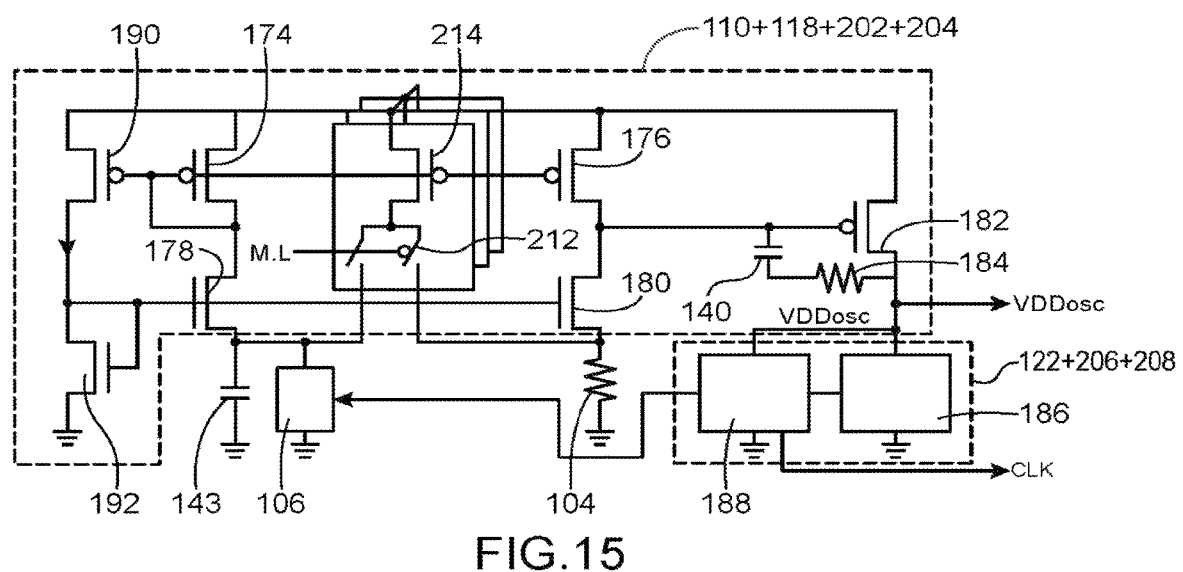

FIG. 15 shows another example embodiment of the device 100 according to the second embodiment. In this figure, all the elements described hereinabove with reference to FIG. 10 are present in this example embodiment, with the addition of the switches 212 and the transistors 214 for adjusting the parameters M and L. Moreover, the frequency dividing and multiplying elements 206, 208 are implemented within the logic circuit 188.

Figure 16:
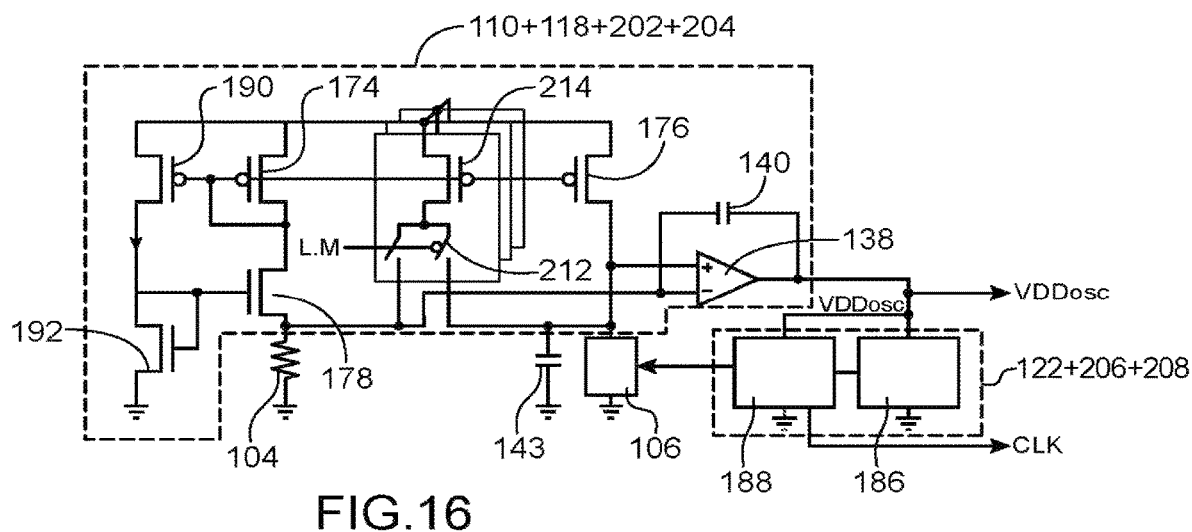

FIG. 16 shows another example embodiment of the device 100 according to the second embodiment. In this figure, all the elements described hereinabove with reference to FIG. 11 are present in this example embodiment, with the exception of the transistor 180. In this example embodiment, the current source and the error amplifier are independent of one another.

In the example embodiments of FIGS. 15 and 16, the transistor 192 may have a higher threshold voltage than the other transistors.

Figure 17:
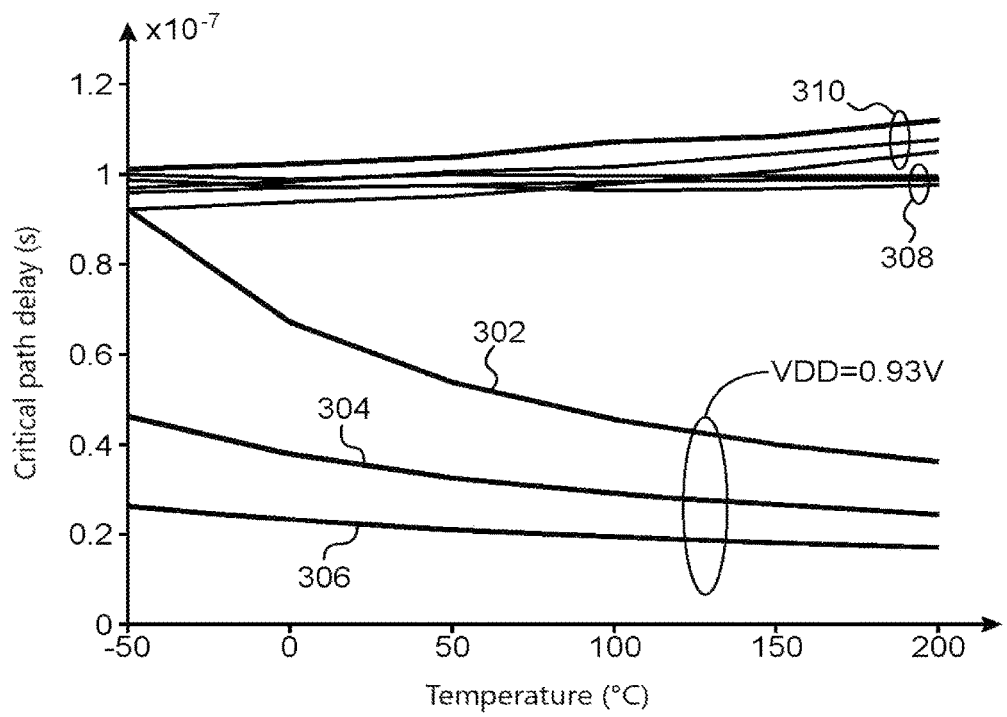
FIGS. 17 and 18 show measurements of the critical path delay and of the supply voltage to a synchronous digital circuit supplied with a voltage of constant value or by a device of the present invention.

The curves 302, 304 and 306 shown in FIG. 17 represent the values of a critical path delay of a synchronous digital circuit supplied with a constant voltage of 0.93 V as a function of the operating temperature of the circuit, and for different process variations (curve 302: slow corner; curve 304: typical corner; curve 306: fast corner). The three curves denoted by the same reference numeral 308 represent the delay values of the same critical path when the digital circuit is supplied with a supply voltage generated by the device 100 comprising a CPR-type oscillator circuit 122, as a function of the operating temperature of the circuit and for the same process variations. The three curves denoted by the same reference numeral 310 represent the delay values of the same critical path when the digital circuit is supplied with a supply voltage generated by the device 100 comprising a ring oscillator-type oscillator circuit 122, as a function of the operating temperature of the circuit and for the same process variations.

Figure 18:
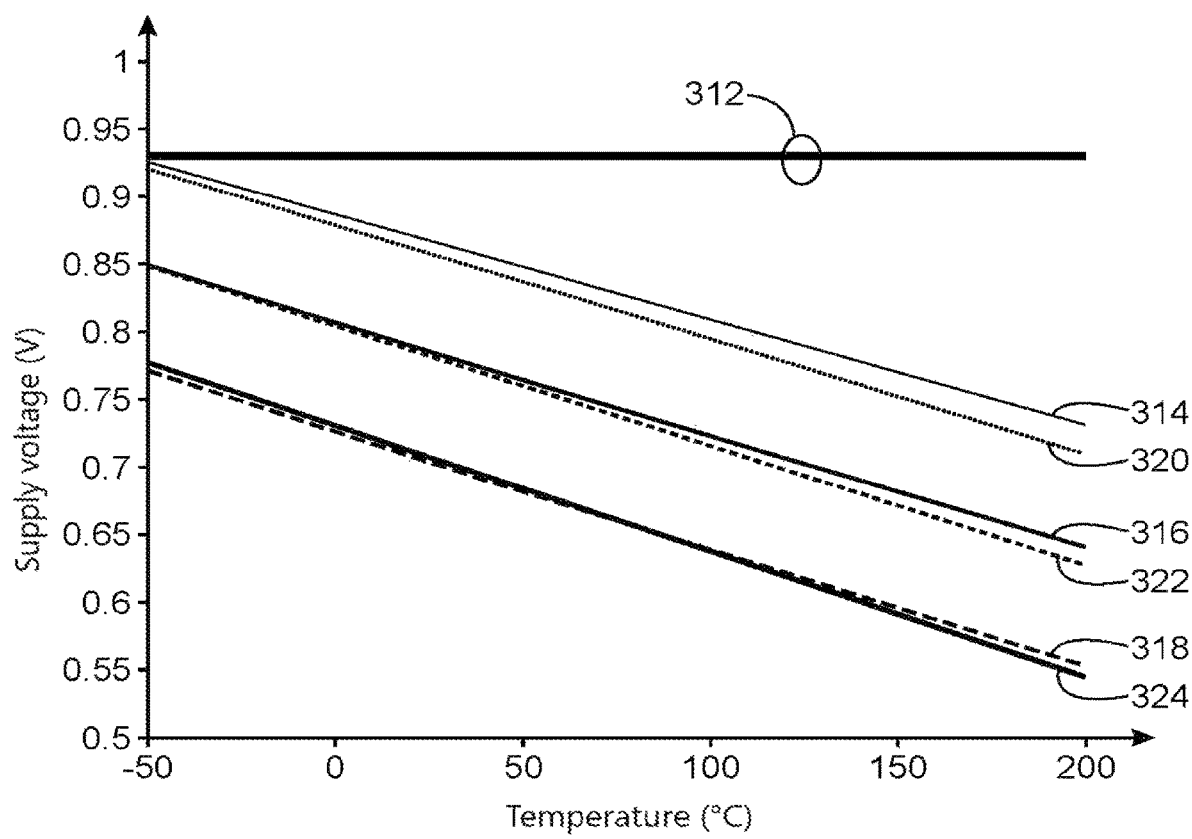

The reference numeral 312 shown in FIG. 18 represents the value of the power supply voltage to this same synchronous digital circuit supplied with a constant voltage of 0.93 V as a function of the operating temperature of the circuit, and for different process variations (slow corner; typical corner; fast corner). The curves 314, 316 and 318 shown in FIG. 18 represent the values of the power supply voltage to this same synchronous digital circuit supplied with a voltage generated by the device 100 comprising a CPR-type oscillator circuit 122, as a function of the operating temperature of the circuit and for the same process variations (curve 314: slow corner; curve 316: typical corner; curve 318: fast corner). The curves 320, 322 and 324 shown in FIG. 18 represent the values of the power supply voltage to this same synchronous digital circuit supplied with a voltage generated by the device 100 comprising a ring oscillator-type oscillator circuit 122, as a function of the operating temperature of the circuit and for the same process variations (curve 320: slow corner; curve 322: typical corner; curve 324: fast corner).

Figure 19:
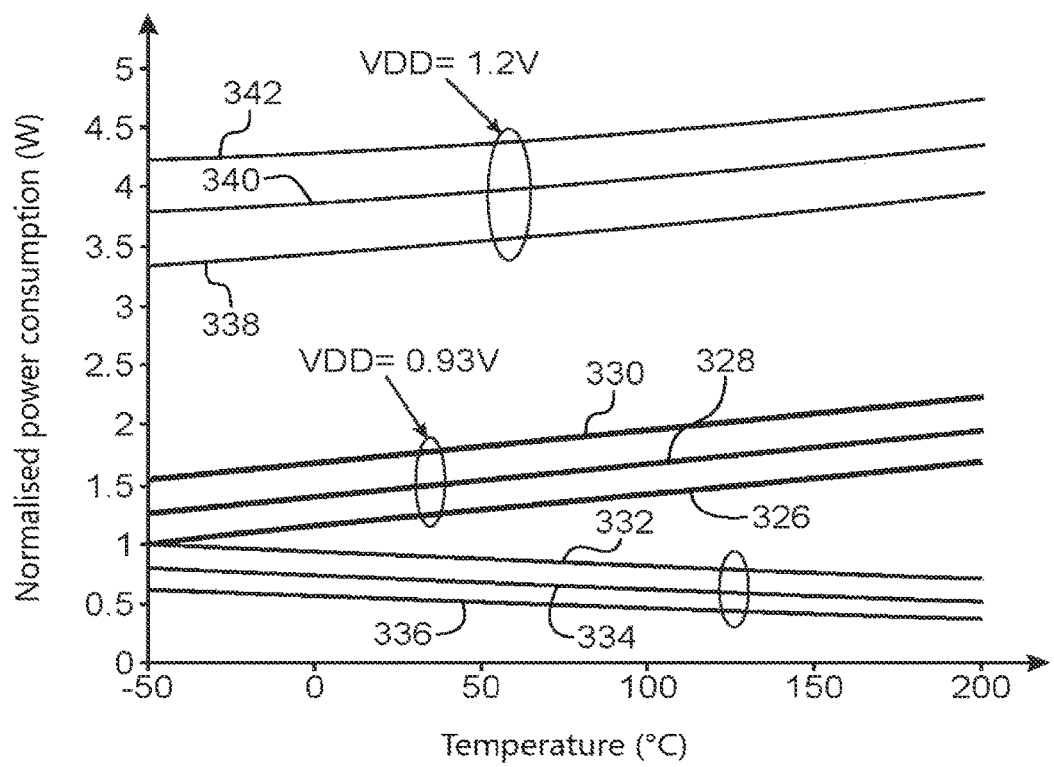
FIG. 19 shows measurements of the normalised power consumption of a synchronous digital circuit supplied with a voltage of constant value or by a device of the present invention.

The curves 326, 328 and 330 shown in FIG. 19 represent the values of the power normalised to, or divided by, the power required to supply the circuit 102 in the worst case of process and temperature variations (the slowest case) in order to facilitate comparison of the relationships between the different powers and the process and temperature variations, and consumed by a synchronous digital circuit supplied with a constant voltage of 0.93 V as a function of the operating temperature of the circuit, and for different process variations (curve 326: slow corner; curve 328: typical corner; curve 330: fast corner). The curves 332, 334 and 336 represent the values of the normalised power consumed by a synchronous digital circuit supplied by a voltage generated by the device 100 as a function of the operating temperature of the circuit, and for different process variations (curve 332: slow corner; curve 334: typical corner; curve 336: fast corner). The curves 338, 340 and 342 represent the values of the normalised power consumed by a synchronous digital circuit supplied by a constant voltage of 1.2 V as a function of the operating temperature of the circuit, and for different process variations (curve 338: slow corner; curve 340: typical corner; curve 342: fast corner). These curves show that for a conventional process, at an operating temperature of 200° C., the power consumed by the circuit is divided by a little less than 4 compared to a fixed voltage supply of 0.93 V, and divided by about 8 compared to a fixed voltage supply of 1.2 V.

Figure 20:
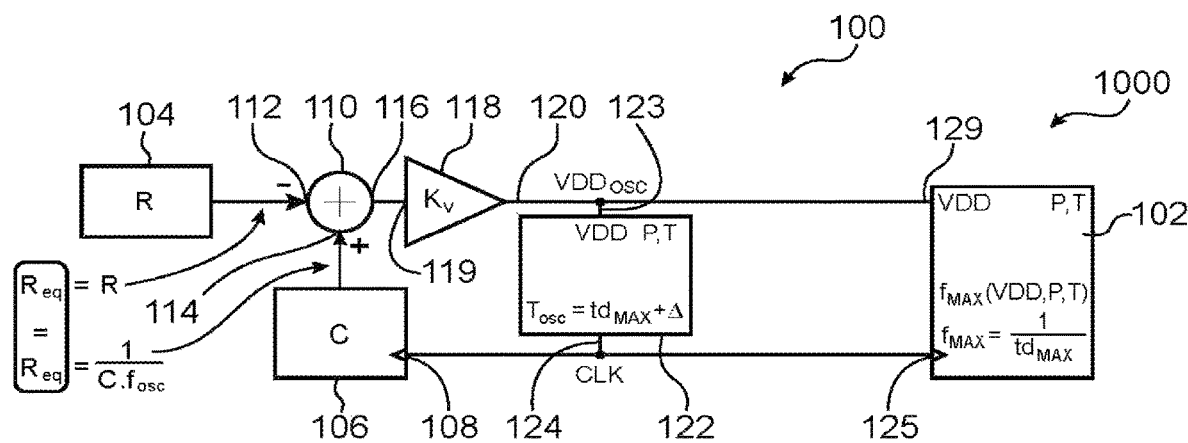
FIG. 20 diagrammatically shows a device for generating a supply voltage and a clock signal intended to supply and clock a synchronous digital circuit, which is the subject matter of the present invention, according to an alternative of the first embodiment.

In FIGS. 17 and 18, compared to the case of constant $V_{DD}$ equal to 0.93 V, the use of the device 100 allows the critical path delay to be process- and temperature-compensated by adapting the supply voltage as a function of the process and temperature variations. The compensation is further improved when the oscillator circuit is of the CPR type. Moreover, when the circuit 102 is supplied with the voltage generated by the device 100, the consumption of the circuit 102 decreases with the temperature and process variations, which is the inverse of the evolution observed when the circuit is supplied with a constant voltage, as can be seen in FIGS. 19 and 20.

Regardless of the embodiment, alternative embodiment or example embodiment of the device 100, the margin delay Δ may be adjusted via a fault sensor present in the circuit 102 and detecting, by iterating an operating test of the circuit 102, the smallest value of the margin delay Δ for which the circuit 102 operates correctly.

Alternatively to the previous embodiments and example embodiments, it is possible for the oscillator circuit 122 to not apply a margin delay Δ, and for the DC-to-DC converter 126 to apply a voltage margin ΔV. In such a case, the converter 126 outputs a voltage $V_{DD}=V_{DDosc}+\Delta V$ (and such that $|V_{DD}|<|V_{DDosc}+\Delta V|$). Such a voltage margin allows, similarly to when the oscillator circuit 122 applies a margin delay Δ, a device 100 to be produced which avoids errors between the propagation path delay of the CPR and the critical path delay of the circuit, due for example to manufacturing dispersions or voltage variations in the supply gate of the circuit. This voltage margin ΔV may be added to the voltage applied at the input of the converter 126, or may be obtained by making the converter 126 such that its gain is greater than 1.

According to another alternative embodiment, the oscillator circuit 122 may apply the margin delay Δ, and the converter 126 may apply the voltage margin ΔV.

Regardless of the embodiment, alternative embodiment or example embodiment of the device 100, it is possible for the latter to not include the DC-to-DC converter 126. In such a case, the output 120 of the amplifier 118, from which the voltage $V_{DDosc}$ is output, is coupled directly to the power supply input 129 of the circuit 102. In the absence of the DC-to-DC converter 126, however, the frequency stability of the signal CLK is degraded by the switching noise from the digital circuit 102 which disturbs the voltage $V_{DDosc}$. FIG. 20 diagrammatically shows the device 100 according to the first embodiment and not including the DC-to-DC converter 126.

Regardless of the embodiment, alternative embodiment or example embodiment of the device 100, it is compatible with an adjustment of the threshold voltage of the transistors of the circuit 102 by back-biasing, when the transistors are of the FDSOI type.

Figure 21:
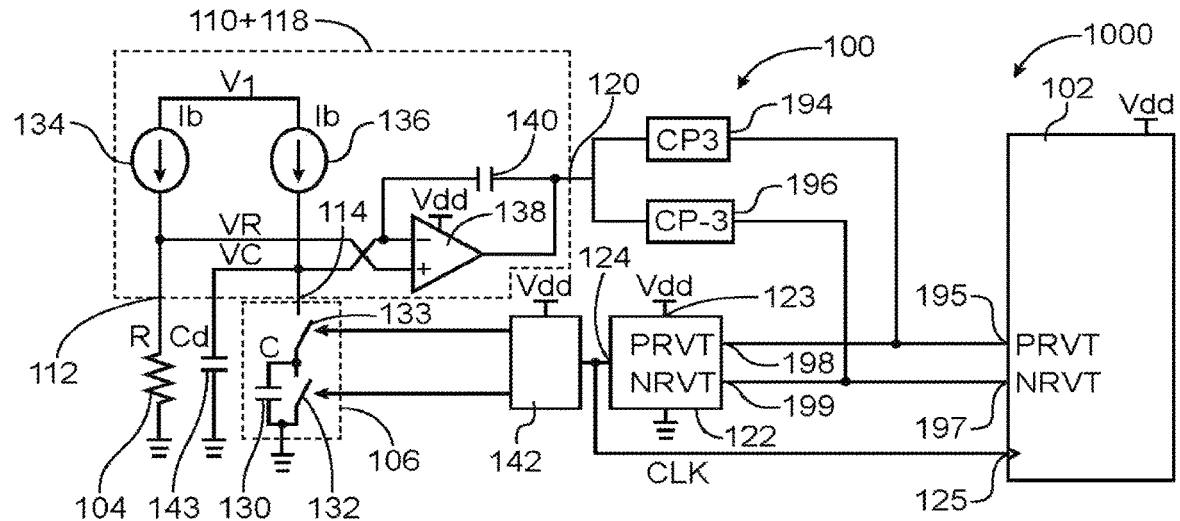
FIGS. 21 and 22 diagrammatically show example embodiments of a device for generating bias voltages and a clock signal intended to bias and clock a synchronous digital circuit, which is the subject matter of the present invention.

FIG. 21 shows a first example embodiment of the device 100 generating back-bias voltages to FDSOI transistors and a clock signal. The device 100 according to this first example embodiment is adapted to provide back-bias voltages to RVT-type FDSOI transistors.

The device 100 includes an amplifier circuit 110+118 comprising the same elements as those described hereinabove with reference to FIG. 2, i.e. the first and second current sources 134, 136, the differential amplifier 138 and the capacitor 140. Because the back-bias voltages generated by the device 100 are intended to be supplied to RVTs, a property whereof allows their operating speed to be reduced as their back-bias voltage (absolute value) increases (as this causes the absolute value for the threshold voltage thereof to increase), the wiring of the inputs of the differential amplifier 138 is inverted compared to that described hereinabove with reference to FIG. 2. Thus, in FIG. 21, the voltage $V_R$ is applied to the non-inverting input of the amplifier 138 and the voltage $V_C$ is applied to the inverting input of the amplifier 138.

The device 100 further includes the resistive element 104, the capacitor 143, the switched capacitor 106, the logic circuit 142 and the oscillator circuit 122. The switched capacitor 106 is controlled by the logic circuit 142 which receives, at the input, the periodic signal CLK output from the output 124 of the oscillator circuit 122. The differential amplifier 138, the synchronous digital circuit 102, the oscillator circuit 122 and the logic circuit 142 are supplied with a supply voltage Vdd which, in contrast to the example embodiments described hereinabove, has a fixed value which is not modulated by the feedback loop formed by the device 100.

The device 100 further includes a first charge pump circuit 194 providing multiplication of the voltage output from the amplifier 138. The multiplication factor of the first charge pump circuit 194 is, for example, equal to 3. The signal output from the first charge pump circuit 194 corresponds to the back-bias voltage to the P-type FDSOI transistors (which are intended to receive a positive back-bias voltage) of the circuit 102 and is applied to a first back-bias voltage input 195 of the P-type FDSOI transistors of the circuit 102 and also to a first back-bias voltage input 198 of the P-type FDSOI transistors of the oscillator circuit 122. The oscillator circuit 122 includes P-type FDSOI RVTs, the back-bias voltage applied whereto corresponding to the signal output from the first charge pump circuit 194.

The device 100 further includes a second charge pump circuit 196 providing multiplication and inversion of the voltage output from the amplifier 138. The multiplication factor of the second charge pump circuit 196 is, for example, equal to −3. The signal output from the second charge pump circuit 196 corresponds to the back-bias voltage to the N-type FDSOI transistors (intended to receive a negative back-bias voltage) of the circuit 102 and is applied to a second back-bias voltage input 197 of the N-type FDSOI transistors of the circuit 102 and also to a second back-bias voltage input 199 of the N-type FDSOI transistors of the oscillator circuit 122. The oscillator circuit 122 includes N-type FDSOI RVTs, the back-bias voltage applied whereto corresponding to the signal output from the second charge pump circuit 196.

The device 100 according to this example embodiment is thus intended for back-biasing FDSOI RVTs of the circuit 102. The device 100 is advantageously used for very low power applications, compatible with high temperatures and low leakage, and thus advantageously to the field of the IoT.

Figure 22:
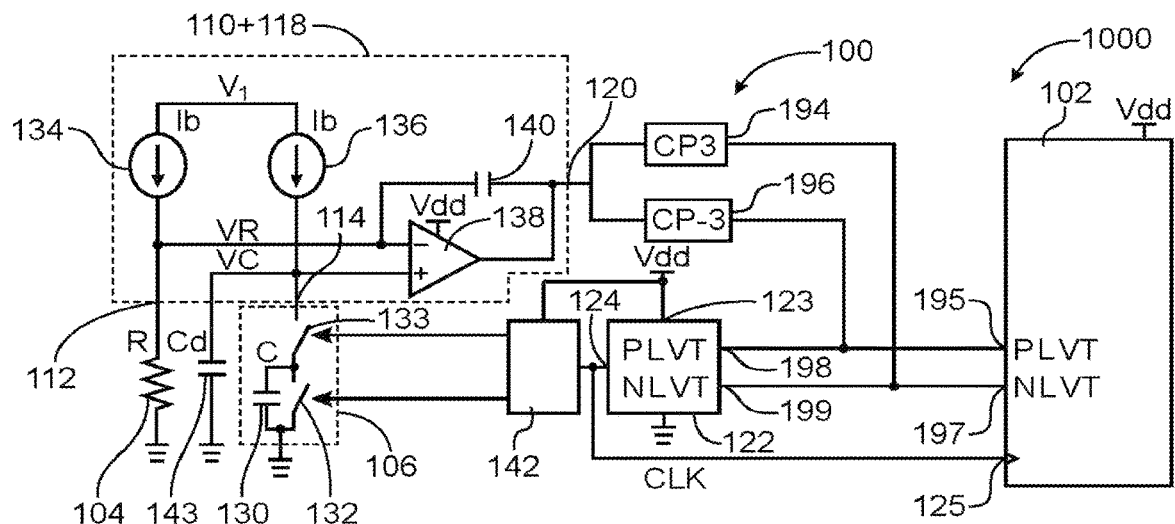

FIG. 22 shows a second example embodiment of the device 100 generating back-bias voltages to FDSOI transistors and a clock signal. The device 100 according to this second example embodiment is adapted to provide back-bias voltages to LVT-type FDSOI transistors.

The device 100 includes an amplifier circuit 110+118 comprising the same elements as those described hereinabove with reference to FIG. 2, i.e. the first and second current sources 134, 136, the differential amplifier 138 and the capacitor 140. Because the back-bias voltages generated by the device 100 are intended to be supplied to LVTs, a property whereof allows their operating speed to be increased as their back-bias voltage (absolute value) increases (as this causes the absolute value for the threshold voltage thereof to decrease), the wiring of the inputs of the differential amplifier 138 is inverted compared to that described hereinabove with reference to FIG. 21 and is similar to that shown in FIG. 2 (voltage $V_R$ applied to the inverting input of the amplifier 138 and voltage $V_C$ applied to the non-inverting input of the amplifier 138).

The device 100 further includes the resistive element 104, the capacitor 143, the switched capacitor 106, the logic circuit 142 and the oscillator circuit 122. The switched capacitor 106 is controlled by the logic circuit 142 which receives, at the input, the periodic signal CLK output from the output 124 of the oscillator circuit 122. The differential amplifier 138, the synchronous digital circuit 102, the oscillator circuit 122 and the logic circuit 142 are supplied with a supply voltage Vdd which has a fixed value, similarly to the example embodiment shown in FIG. 21.

The device 100 further includes the first charge pump circuit 194. The signal output from the first charge pump circuit 194 corresponds to the back-bias voltage to the N-type FDSOI transistors (intended to receive a positive back-bias voltage) of the circuit 102. The device 100 further includes the second charge pump circuit 196. The signal output from the second charge pump circuit 196 corresponds to the back-bias voltage to the P-type FDSOI transistors (intended to receive a negative back-bias voltage) of the circuit 102 and of the oscillator circuit 122, and is thus applied to the first back-bias voltage input 195 of the P-type FDSOI transistors of the circuit 102 and also to the first back-bias voltage input 198 of the P-type FDSOI transistors of the oscillator circuit 122. The signal output from the first charge pump circuit 194 corresponds to the back-bias voltage to the N-type FDSOI transistors (intended to receive a positive back-bias voltage) of the circuit 102 and of the oscillator circuit 122, and is thus applied to the second back-bias voltage input 197 of the N-type FDSOI transistors of the circuit 102 and also to the second back-bias voltage input 199 of the N-type FDSOI transistors of the oscillator circuit 122.

The device 100 according to this second example embodiment is thus intended for back-biasing FDSOI LVTs. The device 100 is advantageously used for very low voltage applications, intended for standard operating temperatures and low power consumption, and thus for example in the field of implanted medical devices.

Moreover, the converter 126 may be interposed between the output of the amplifier 138 and the charge pump circuits 194, 196.

Alternatively, the device may regulate the bias voltage to only one type of transistor, N or P.

In the above example embodiments, the charge pump circuits 194, 196 provide for multiplication and/or inversion of the output voltage from the amplifier 138, for example to obtain voltages of negative value or voltages higher than the supply voltage $V_{DD}$.

When the device 100 generates the one or more back-bias voltages for the FDSOI transistors of the synchronous digital circuit 102, it is possible for the device 100 to not include the charge pump circuits 194, 196. For example, when the device 100 generates the supply voltage for the circuit 102, instead of using the charge pump circuits, a DC-to-DC voltage converter adapted to output one or more supply voltages with a range of values corresponding to that desired for the back-bias voltages to the transistors and comprised between the electric reference potential, for example the ground, and $V_{DD}$, may be used.

Furthermore, even when the device 100 generates negative voltage values or voltage values greater than the supply voltage $V_{DD}$, circuits that differ from charge pump circuits, such as boost converter-type circuits, may be used.

Moreover, whether the device 100 generates the one or more back-bias voltages for the FDSOI transistors of the circuit 102 or supplies the circuit 102, it is possible for the control of the bias voltage or the supply voltage, between the amplifier circuit 110+118 and the circuit 102, to not modify the sign of the voltage received at its input nor apply a multiplication factor, but merely copy, at its output, the voltage received at its input, or merely match the value of the voltage received at its input with that desired for the one or more supply or bias voltages intended to be obtained at its output. In such a case, the presence of the charge pump or DC-to-DC conversion circuits is not necessary.

Moreover, when the device 100 regulates the bias voltage to only one type of transistor, N or P, the output of the amplifier circuit 110+118 may be coupled directly to the input 195 or 197.

Furthermore, it is clear from the various examples described hereinabove that the frequency of the circuit 102 may be defined from the components R, C and from a set of circuit elements such that the operating frequency thereof corresponds to a multiple of the inverse of the RC constant.

Regardless of the embodiment, alternative embodiment or example embodiment of the device 100, this device 100 is advantageously used for applications in which very low power consumption constitutes the main criterion to be taken into account, for example in the field of the Internet of Things (IoT), wherein the circuit integrating the device 100 has the following properties:

- the circuit has an antenna, a computation and memory unit, a measurement unit;
- the circuit operates with a low number of different operating frequencies (for example 2 or 3);
- the circuit is adapted to operate in an unstable environment;
- the determination of the operating frequency of the circuit does not require high accuracy (a few percent error value is permissible).

Alternatively, the device 100 may advantageously be used in the field of implanted medical electronics, wherein the circuit integrating the device 100 has the following properties:

- the circuit operates at a stable, near-constant temperature;
- the circuit has a sleep function wherein it must have an extremely low power consumption.

The invention claimed is:

1. A device for generating at least one bias voltage and at least one clock signal, configured to bias back faces of FDSOI transistors of asynchronous digital circuit and to clock the synchronous digital circuit, the device comprising:
    an oscillator circuit comprising a signal propagation path, a delay whereof is representative of a delay of a critical path of the synchronous digital circuit and which varies as a function of a value of at least one back-bias voltage supplied to FDSOI transistors of the oscillator circuit, and configured to output, from an output, which is configured to be coupled to a clock input of the synchronous digital circuit, a periodic signal, a frequency whereof depending on the delay of the signal propagation path;
    a resistive element of resistance R;
    a switched capacitor comprising a capacitance C and which is coupled to the output of the oscillator circuit such that a switching frequency of the switched capacitor corresponds to the frequency of the periodic signal output from the output of the oscillator circuit or to a multiple or to a divisor of the frequency of the periodic signal output from the output of the oscillator circuit; and
    an amplifier circuit configured to output, from an output coupled to at least one back-bias voltage input of the FDSOI transistors of the oscillator circuit, a voltage, an amplitude whereof is representative of a difference between a value of the resistance R and a value of an equivalent resistance of the switched capacitor.

2. The device according to claim 1, wherein the oscillator circuit is a Critical Path Replica (CPR) or includes at least one ring oscillator.

3. The device according to claim 1, wherein the oscillator circuit is configured such that the frequency of the periodic signal output from the output of the oscillator circuit is $f_{OSC}=1/(td_{MAX}+\Delta)$, where $td_{MAX}$ corresponds to the delay of the critical path of the synchronous digital circuit and $\Delta$ corresponds to a margin delay.

4. The device according to claim 1, wherein the signal propagation path of the oscillator circuit has an odd number of inverting elements and forms a loop such that an output of the signal propagation path is connected to an input of the signal propagation path, and wherein a propagation delay between the input and the output of the signal propagation path is equal to $1/(2 \cdot f_{OSC})$.

5. The device according to claim 1, wherein the amplifier circuit includes:
    a first current source coupled to the resistive element and a second current source coupled to the switched capacitor, the first and second current sources being configured to output electrical currents of a same value into the resistive element and the switched capacitor; and
    a differential amplifier connected as an integrator, including a first input coupled to the resistive element such that a voltage across terminals of the resistive element is applied to the first input, and a second input coupled to the switched capacitor such that a voltage across terminals of the switched capacitor is applied to the second input.

6. The device according to claim 1, wherein the amplifier circuit includes:
    a current source coupled to the resistive element and to the switched capacitor, which are coupled in series to one another;
    two impedances coupled in series to one another and in parallel to the resistive element and the switched capacitor;
    a differential amplifier connected as an integrator, including a first input coupled to a first node to which the two impedances are coupled, and a second input coupled to a second node to which the resistive element and the switched capacitor are coupled.

7. The device according to claim 1, further including a logic circuit comprising an input coupled to the output of the oscillator circuit and two outputs each coupled to one of two switches of the switched capacitor, the logic circuit being configured to output, from the two outputs, periodic signals of frequency equal to $f_{OSC}/N$, where N is an integer greater than or equal to 1, and each alternately controlling an opening and a closing of one of the two switches of the switched capacitor.

8. The device according to claim 7, wherein a power supply input of the logic circuit is coupled to a power supply input of the oscillator circuit.

9. The device according to claim 1, wherein the switched capacitor includes two capacitors coupled in series to one another and each having a capacitance of value C/2, each of the two capacitors being coupled in parallel to a switch of the switched capacitor.

10. The device according to claim 1, wherein the oscillator circuit is configured to output, from the output of the oscillator circuit, the periodic signal, which comprises K phases, where K is an integer greater than or equal to 2, wherein the device includes K switched capacitors coupled in parallel to one another and coupled to the output of the oscillator circuit such that each of the K switched capacitors is controlled by one of the K phases of the periodic signal.

11. The device according to claim 1, including a DC-to-DC voltage converter comprising an input coupled to the output of the amplifier circuit.

12. The device according to claim 11, wherein the DC-to-DC voltage converter is configured to output a voltage equal to a sum of a voltage applied to the input of the DC-to-DC voltage converter and a voltage margin ΔV.

13. The device according to claim 1, further comprising at least one charge pump circuit comprising an input coupled to the output of the amplifier circuit and comprising at least one output coupled to said at least one back-bias voltage input of the FDSOI transistors of the oscillator circuit.

14. The device according to claim 1, further including at least one of:
- a first element equivalent to a multiplier of the value of the resistance R;
- a second element equivalent to a multiplier of the value of an impedance of the switched capacitor;
- a frequency divider interposed between the output of the oscillator circuit and the switched capacitor; and
- a frequency multiplier coupled to the output of the oscillator circuit.

15. An electronic chip, comprising:
the device according to claim 1,
wherein the synchronous digital circuit includes a power supply input coupled to the output of the amplifier circuit.

16. The electronic chip according to claim 15, wherein the power supply input of the synchronous digital circuit is coupled to a power supply input of the oscillator circuit.

17. An electronic chip, comprising:
the device according to claim 1
wherein the synchronous digital circuit includes at least one back-bias input for the FDSOI transistors, wherein the at least one back-bias input for the FDSOI transistors of the synchronous digital circuit is coupled to the output of the amplifier circuit.

18. The electronic chip according to claim 17, wherein said at least one back-bias input for the FDSOI transistors of the synchronous digital circuit is coupled to said at least one back-bias voltage input of the FDSOI transistors of the oscillator circuit.

19. An electronic chip, comprising:
the device according to claim 1,
wherein the device further includes a charge pump circuit coupled to the output of the amplifier circuit, and
the synchronous digital circuit comprises a power supply input coupled to the output of the charge pump circuit.

20. An electronic chip, comprising:
the device according to claim 1,
wherein the device further includes a voltage converter circuit coupled to the output of the amplifier circuit, and
the synchronous digital circuit comprises a power supply input coupled to the output of the voltage converter.

* * * * *